United States Patent
Nam et al.

(10) Patent No.: US 11,831,918 B2
(45) Date of Patent: Nov. 28, 2023

(54) IMAGE CODING USING TRANSFORM INDEX

(71) Applicant: LG ELECTRONICS INC., Seoul (KR)

(72) Inventors: Junghak Nam, Seoul (KR); Jaehyun Lim, Seoul (KR); Moonmo Koo, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/503,792

(22) Filed: Oct. 18, 2021

(65) Prior Publication Data

US 2022/0046281 A1 Feb. 10, 2022

Related U.S. Application Data

(63) Continuation of application No. PCT/KR2020/005079, filed on Apr. 16, 2020.
(Continued)

(51) Int. Cl.
| | |
|---|---|
| *H04N 19/60* | (2014.01) |
| *H04N 19/122* | (2014.01) |
| *H04N 19/159* | (2014.01) |
| *H04N 19/176* | (2014.01) |
| *H04N 19/18* | (2014.01) |

(52) U.S. Cl.
CPC ........... *H04N 19/60* (2014.11); *H04N 19/122* (2014.11); *H04N 19/159* (2014.11); *H04N 19/176* (2014.11); *H04N 19/18* (2014.11)

(58) Field of Classification Search
CPC .... H04N 19/60; H04N 19/122; H04N 19/159; H04N 19/176; H04N 19/18; H04N 19/124; H04N 19/593
See application file for complete search history.

(56) References Cited

U.S. PATENT DOCUMENTS

| | | |
|---|---|---|
| 2009/0226103 A1 | 9/2009 | Choi et al. |
| 2018/0103252 A1* | 4/2018 | Hsieh .................. H04N 19/176 |

(Continued)

FOREIGN PATENT DOCUMENTS

| | | |
|---|---|---|
| KR | 10-2015-0070845 | 6/2015 |
| KR | 10-2018-0063186 | 6/2018 |

(Continued)

OTHER PUBLICATIONS

Bross et al. "Versatile Video Coding," presented at Joint Video Experts Team (JVET) of ITU0T SG 16 WP 3 and ISO/IEC JTC 1/SC 29/WG 11, JVET-N1001-v2, Geneva, CH, Mar. 19-27, 2019, 362 pages.

(Continued)

*Primary Examiner* — Dramos Kalapodas
(74) *Attorney, Agent, or Firm* — Fish & Richardson P.C.

(57) ABSTRACT

An image decoding method according to the present document comprises the steps of: receiving image information including residual information for a current block; and generating residual samples of the current block on the basis of the residual information, wherein the residual information includes information on transform coefficients of the current block, and the residual samples are generated from the information on the transform coefficients on the basis of low-frequency non-separable transform (LFNST) index information.

4 Claims, 17 Drawing Sheets

Related U.S. Application Data

(60) Provisional application No. 62/834,950, filed on Apr. 16, 2019.

(56) References Cited

U.S. PATENT DOCUMENTS

| | | | |
|---|---|---|---|
| 2018/0176557 A1 | | 6/2018 | Ichigaya et al. |
| 2018/0288409 A1 | | 10/2018 | Heo et al. |
| 2018/0302631 A1 | * | 10/2018 | Chiang ................ H04N 19/176 |
| 2018/0310000 A1 | | 10/2018 | Heo et al. |
| 2020/0322623 A1 | * | 10/2020 | Chiang ................ H04N 19/159 |
| 2021/0297672 A1 | * | 9/2021 | Deng ................... H04N 19/117 |
| 2021/0306666 A1 | * | 9/2021 | Lee ........................ H04N 19/61 |

FOREIGN PATENT DOCUMENTS

| | | | | |
|---|---|---|---|---|
| WO | WO 2014/104242 | | 7/2014 | |
| WO | WO 2018/026148 | | 2/2018 | |
| WO | 2018/166429 | | 9/2018 | |
| WO | WO 2018174402 | | 9/2018 | |
| WO | WO-2020185022 A1 | * | 9/2020 | ........... H04N 19/105 |
| WO | WO 2020/207493 | | 10/2020 | |
| WO | WO 2020/211765 | | 10/2020 | |
| WO | WO 2020/213677 | | 10/2020 | |
| WO | WO-2020207493 A1 | * | 10/2020 | ........... H04N 19/105 |
| WO | WO-2020211765 A1 | * | 10/2020 | ............. H04N 19/11 |
| WO | WO-2020213677 A1 | * | 10/2020 | ........... H04N 19/126 |

OTHER PUBLICATIONS

Koo et al. "CE6: Reduced Secondary Transform (RST) (CE6-3.1)," presented at Joint Video Experts Team (JVET) of ITU-T SG16 WP 3 and ISO/IEC JTC 1/SC 29/WG 11, JVET-N0193, Geneva, CH, Mar. 19-27, 2019, 21 pages.

Pfaff et al., "CE3: Affine linear weighted intra prediction (CE3-4.1, CE3-4.2)," presented at Joint Video Experts Team (JVET) of ITU-T SG 16 WP 3 and ISO/IEC JTC 1/SC 29WG 11, JVET-N0217, Geneva, CH, Mar. 19-27, 2019, 19 pages.

Salehifar et al., "CE 6.2.6: Reduced Secondary Transform (RST)," Joint Video Experts Team (JVET) of ITU-T SG 16 WP 3 and ISO/IEC JTC 1/SC 29/WG 11, Document: JVET-K0099, Version 2, 11th Meeting: Ljubljana, SI, Jul. 10-18, 2018, 12 pages.

Salehifar et al., "CE 6.2.6: Reduced Secondary Transform (RST)," Joint Video Experts Team (JVET) of ITU-T SG 16 WP 3 and ISO/IEC JTC 1/SC 29/WG 11, Document: JVET-K0099, Version 3, 11th Meeting: Ljubljana, SI, Jul. 10-18, 2018, 12 pages.

Salehifar et al., "CE 6.2.6: Reduced Secondary Transform (RST)," Joint Video Experts Team (JVET) of ITU-T SG 16 WP 3 and ISO/IEC JTC 1/SC 29/WG 11, Document: JVET-K0099, Version 4, 11th Meeting: Ljubljana, SI, Jul. 10-18, 2018, 12 pages.

Extended European Search Report in European Application No. 20791377.3, dated May 30, 2022, 13 pages.

Huo et al., "Modification of LFNST for MIP coded block," Joint Video Experts Team (JVET) of ITU-T SG 16 WP 3 and ISO/IEC JTC 1/SC 29/WG 11, Document: JVET-Q0453-v2, 17th Meeting: Brussels, BE, Jan. 7-17, 2020, 6 pages.

Koo et al., "Low Frequency Non-Separable Transform (LFNST)," 2019 Picture Coding Symposium (PCS), Nov. 12, 2019, 5 pages.

Office Action in Indian Application No. 202117051351, dated Jun. 22, 2022, 6 pages.

Office Action in Korean Application No. 10-2021-7032787, dated May 24, 2022, 4 pages (with English translation).

Pfaff et al., "CE3: Affine linear weighted intra prediction (test 1.2.1, test 1.2.2)," Joint Video Experts Team (JVET) of ITU-T SG 16 WP 3 and ISO/IEC JTC 1/SC 29/WG 11, Document: JVET-M0043, 13th Meeting: Marrakech, MA, Jan. 9-18, 2019, 11 pages.

Salehifar et al., "CE 6.2.6: Reduced Secondary Transform (RST)," Joint Video Experts Team (JVET) of ITU-T SG 16 WP 3 and ISO/IEC JTC 1/SC 29/WG 11, Document: JVET-K0099, 11th Meeting: Ljubljana, CN, Jul. 18-24, 2018, 9 pages.

Salehifar et al., "CE 6.2.6: Reduced Secondary Transform (RST)," Joint Video Experts Team (JVET) of ITU-T SG 16 WP 3 and ISO/IEC JTC 1/SC 29/WG 11, Document: JVET-K0099, 11th Meeting: Ljubljana, SI, Jul. 10-18, 2018, 12 pages.

Zhao et al., "CE3-related: MPM based multi-line intra prediction scheme," Joint Video Experts Team (JVET) of ITU-T SG 16 WP 3 and ISO/IEC JTC 1/SC 29/WG 11, Document: JVET-K0482_r1, 11th Meeting: Ljubljana, CN, Jul. 10-18, 2018, 3 pages.

Notice of Allowance in Japanese Appln. No. 2021-562007, dated Nov. 15, 2022, 4 pages (with English translation).

Office Action in Chinese Appln. No. 202080036149.9, dated Jun. 3, 2023, 16 pages (with English translation).

\* cited by examiner

IMAGE CODING USING TRANSFORM INDEX

CROSS-REFERENCE TO RELATED APPLICATIONS

Pursuant to 35 U.S.C. § 119(e), this application is a continuation of International Application No. PCT/KR2020/005079, filed Apr. 16, 2020, which claims the benefit of U.S. Provisional Application No. 62/834,950, filed Apr. 16, 2019, the contents of which are hereby incorporated by reference herein in its entirety.

BACKGROUND OF THE DISCLOSURE

Field of the Disclosure

The present disclosure relates to an image coding technology, and more particularly, to an image coding using a transform index.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

According to an embodiment of the present document, a method and an apparatus for enhancing image/video coding efficiency are provided.

According to an embodiment of the present document, a method and an apparatus for image coding using transform index information are provided.

According to an embodiment of the present document, a method and an apparatus for transforming a block to which matrix based intra prediction (MIP) is applied are provided.

According to an embodiment of the present document, a method and an apparatus for transforming a block to which MIP is applied by signaling transformation index information are provided.

According to an embodiment of the present document, a method and an apparatus for signaling transformation index information only for a block to which MIP is not applied are provided.

According to an embodiment of the present document, a method and an apparatus for transforming a block to which MIP is applied by inducing transformation index information are provided.

According to an embodiment of the present document, a method and an apparatus for a binarization or an entropy coding about transform index information are provided.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

According to the present document, the overall image/video compression efficiency can be enhanced.

According to the present document, a block to which Matrix based Intra Prediction (MIP) is applied can be efficiently (inversely) transformed by efficiently signaling the transformation index.

According to the present document, a transform index for a block to which MIP is applied can be efficiently coded.

According to the present document, a transform index for a block to which MIP is applied can be induced without separately signaling the transform index.

According to the present document, in case that MIP and low frequency non-separable transform (LFNST) are all applied, interference between them can be minimized, an optimum coding efficiency can be maintained, and complexity can be reduced.

Effects that can be obtained through a detailed example of the present document are not limited to the effects enumerated above. For example, there may be various technical effects that can be understood or induced by a person having ordinary skill in the related art from the present document. Accordingly, the detailed effects of the present document are not limited to those explicitly stated in the present document, but may include various effects that can be understood or induced from the technical features of the present document.

DESCRIPTION OF EXEMPLARY EMBODIMENTS

Figure 1:
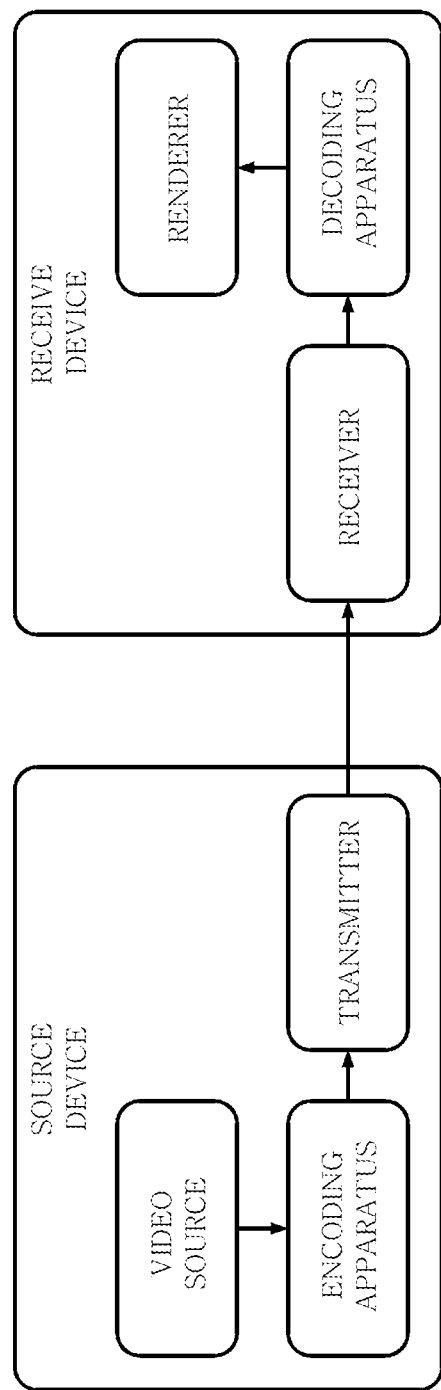
FIG. 1 schematically illustrates an example of a video/image coding system to which the present document is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of this document, embodiments in which configurations are combined and/or separated are included in the scope of claims.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In the present specification, "at least one of A and B" may mean "only A", "only B", or "both A and B". Further, in the present specification, the expression "at least one of A or B" or "at least one of A and/or B" may be interpreted the same as "at least one of A and B".

Further, in the present specification, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

Hereinafter, examples of the present embodiment will be described in detail with reference to the accompanying drawings. In addition, like reference numerals are used to indicate like elements throughout the drawings, and the same descriptions on the like elements will be omitted.

In the present specification, technical features individually explained in one drawing may be individually implemented, or may be simultaneously implemented.

FIG. 1 illustrates an example of a video/image coding system to which the disclosure of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, methods/embodiments disclosed in this document may be related to the versatile video coding (VVC) standard (ITU-T Rec. H.266), the next-generation video/image coding standard after VVC, or other video coding related standards (e.g., high efficiency video coding (HEVC) standard (ITU-T Rec. H.265), essential video coding (EVC) standard, AVS2 standard, and the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

Figure 2:
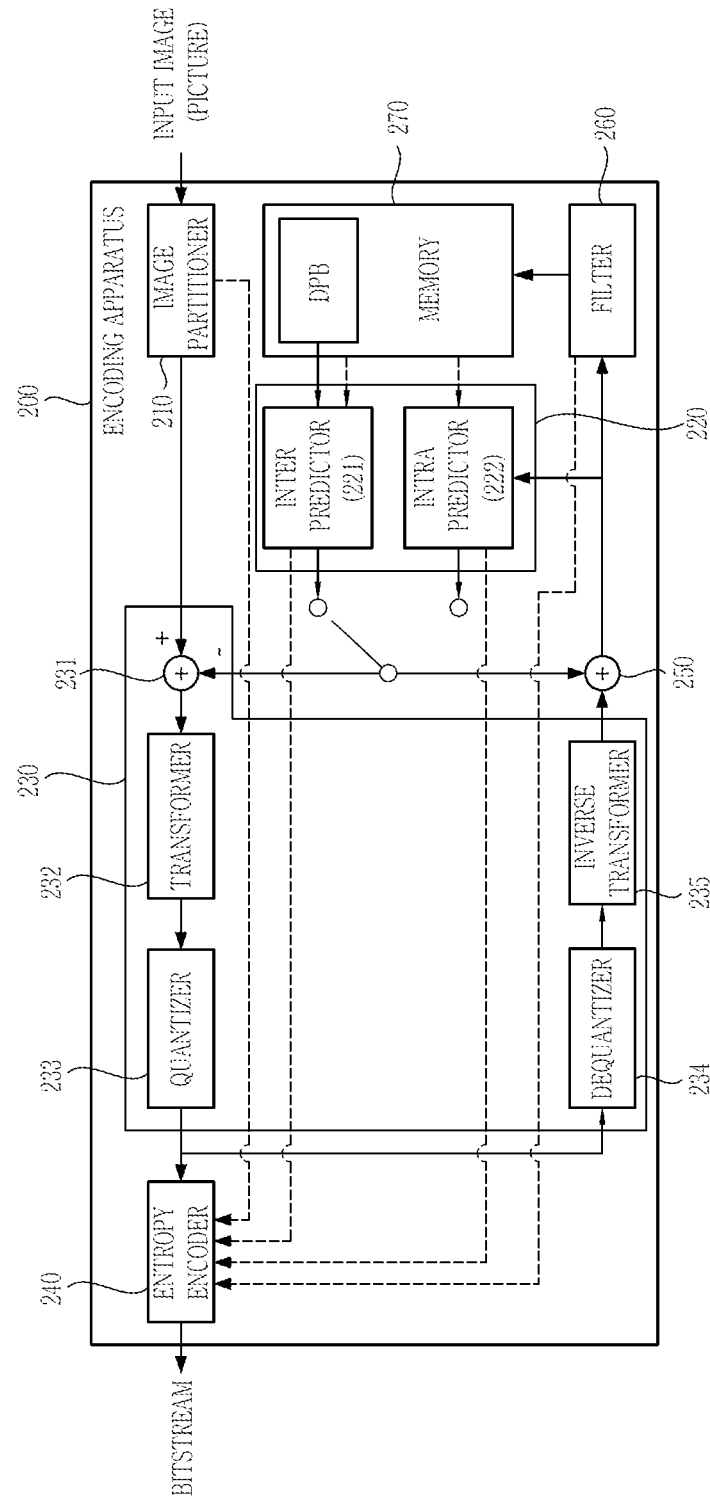
FIG. 2 is a diagram schematically explaining the configuration of a video/image encoding apparatus to which the present document is applicable.

FIG. 2 is a diagram schematically illustrating the configuration of a video/image encoding apparatus to which the disclosure of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The subtractor 231 may generate a residual signal (residual block, residual samples, or residual sample array) by subtracting a prediction signal (predicted block, prediction samples, or prediction sample array) output from the predictor 220 from an input image signal (original block, original samples, or original sample array), and the generated residual signal is transmitted to the transformer 232. The predictor 220 may perform prediction for a processing target block (hereinafter, referred to as a "current block"), and generate a predicted block including prediction samples for the current block. The predictor 220 may determine whether intra prediction or inter prediction is applied on a current block or in a CU unit. As described later in the description of each prediction mode, the predictor may generate various kinds of information related to prediction, such as prediction mode information, and transfer the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to the transform obtained based on a prediction signal generated using all previously reconstructed pixels. In addition, the transform process may be applied to square pixel blocks having the same size, or may be applied to blocks having a variable size rather than a square.

The quantizer 233 may quantize the transform coefficients and transmit them to the entropy encoder 240, and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order, and generate information on the quantized transform coefficients based on the quantized transform coefficients in the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction together with or separately from the quantized transform coefficients (e.g., values of syntax elements and the like). Encoded information (e.g., encoded video/image information) may be transmitted or stored in the unit of a network abstraction layer (NAL) in the form of a bitstream. The video/image information may further include information on various parameter sets, such as an adaptation parameter set (APS), a picture parameter set (PPS), a sequence parameter set (SPS), or a video parameter set (VPS). In addition, the video/image information may further include general constraint information. In the present document, information and/or syntax elements being signaled/transmitted to be described later may be encoded through the above-described encoding procedure, and be included in the bitstream. The bitstream may be transmitted through a network, or may be stored in a digital storage medium. Here, the network may include a broadcasting network and/or a communication network, and the digital storage medium may include various storage media, such as USB, SD, CD, DVD, Blu-ray, HDD, SSD, and the like. A transmitter (not illustrated) transmitting a signal output from the entropy encoder 240 and/or a storage unit (not illustrated) storing the signal may be configured as an internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed samples, or reconstructed sample array). If there is no residual for the processing target block, such as a case that a skip mode is applied, the predicted block may be used as the reconstructed block. The generated reconstructed signal may be used for intra prediction of a next processing target block in the current picture, and may be used for inter prediction of a next picture through filtering as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset (SAO), an adaptive loop filter, a bilateral filter, and the like. The filter 260 may generate various kinds of information related to the filtering, and transfer the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
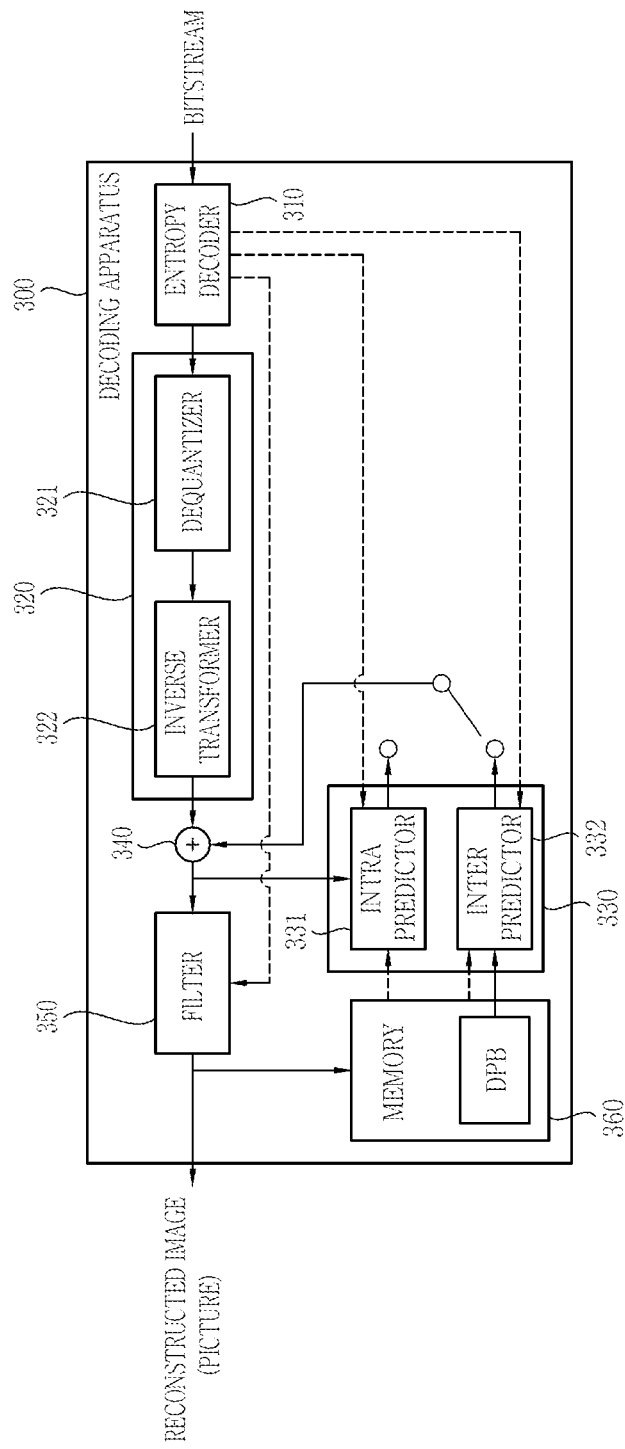
FIG. 3 is a diagram schematically explaining the configuration of a video/image decoding apparatus to which the present document is applicable.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding has been performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a constituent element of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The intra predictor 332 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 332 may determine the prediction mode to be applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 331 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array) output from the predictor 330. If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or motion information of the blocks in the picture having already been reconstructed. The stored motion information may be transferred to the inter predictor 331 so as to be utilized as the motion information of the spatial neighboring block or the motion information of the temporal neighboring block. The memory 360 may store reconstructed samples of reconstructed blocks in the current picture, and transfer the reconstructed samples to the intra predictor 332.

In the present specification, the embodiments described in the predictor 330, the dequantizer 321, the inverse transformer 322, and the filter 350 of the decoding apparatus 300 may also be applied in the same manner or corresponding to the predictor 220, the dequantizer 234, the inverse transformer 235, and the filter 260 of the encoding apparatus 200.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
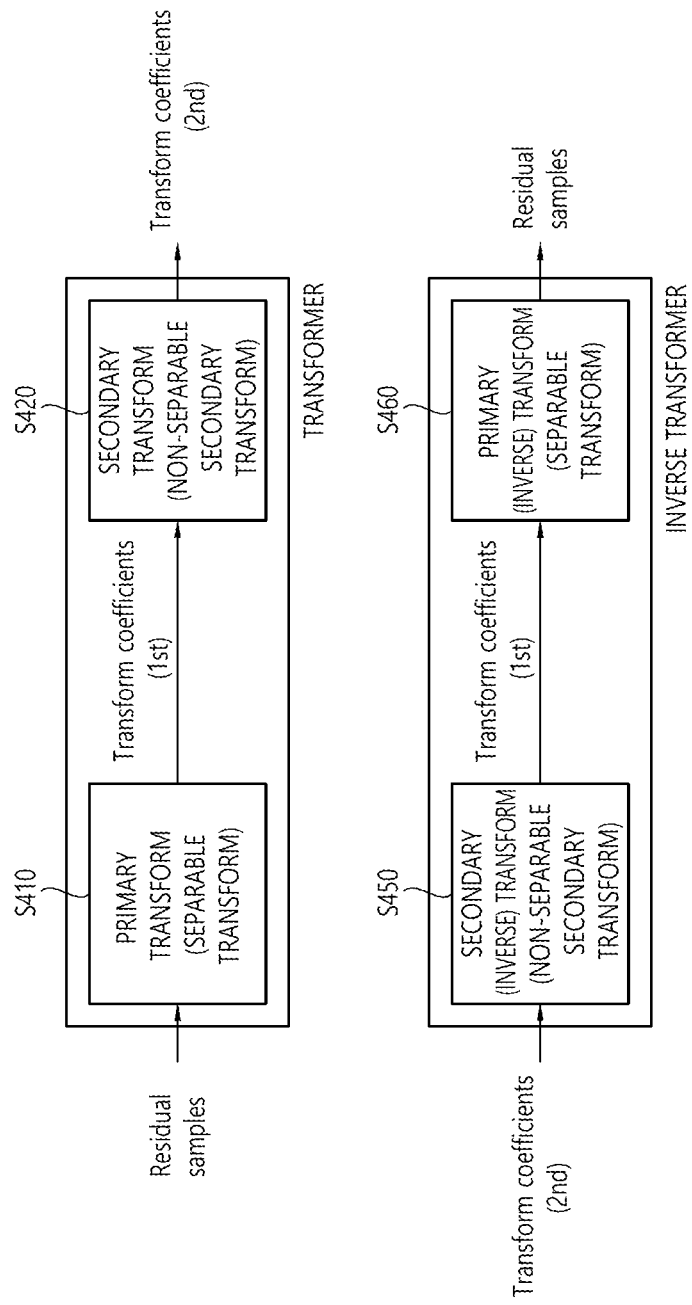
FIG. 4 schematically illustrates a multi-transform technique according to an embodiment of the present document.

FIG. 4 schematically illustrates a multi-transform technique according to the present document.

Referring to FIG. 4, a transformer may correspond to the transformer in the encoding apparatus of FIG. 2 as described above, and an inverse transformer may correspond to the inverse transformer in the encoding apparatus of FIG. 2, or the inverse transformer in the decoding apparatus of FIG. 3 as described above.

The transformer may derive (primary) transform coefficients by performing primary transform based on residual sample (residual sample array) in a residual block (S410). Such primary transform may be referred to as a core transform. Here, the primary transform may be based on multiple transform selection (MTS), and in case that the multi-transform is applied as the primary transform, it may be referred to as multi core transform.

For example, the multi core transform may represent a transform method by additionally using discrete cosine transform (DCT) type 2 (DCT-II), discrete sine transform (DST) type 7 (DST-VII), DCT type 8 (DCT-VIII), and/or DST type 1 (DST-I). That is, the multi core transform may represent a transform method for transforming a residual signal (or residual block) of a spatial domain into transform coefficients (or primary transform coefficients) of a frequency domain based on a plurality of transform kernels selected among the DCT type 2, the DST type 7, the DCT type 8, and the DST type 1. Here, the primary transform coefficients may be called temporary transform coefficients on the transformer side.

In other words, in case that the existing transform method is applied, transform of the spatial domain for the residual signal (or residual block) into the frequency domain may be applied based on the DCT type 2, and the transform coefficients may be generated. However, unlike this, in case that the multi core transform is applied, transform of the spatial domain for the residual signal (or residual block) into the frequency domain may be applied based on the DCT type 2, DST type 7, DCT type 8, and/or DST type 1, and the transform coefficients (or primary transform coefficients) may be generated. Here, the DCT type 2, DST type 7, DCT type 8, and DST type 1 may be called the transform type, transform kernel, or transform core. The DCT/DST transform types may be defined based on basis functions.

In case that the multi core transform is performed, a vertical transform kernel and/or a horizontal transform kernel for a target block may be selected among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on the prediction mode and/or transform index of the target block (CU or subblock) including the residual block.

Further, for example, in case of performing primary transform by applying MTS, specific basis functions may be configured to specified values, and in case of the vertical transform or horizontal transform, the mapping relationship for the transform kernel may be configured by combining what basis functions are applied. For example, in case that the horizontal direction transform kernel is represented by trTypeHor, and the vertical direction transform kernel is represented by trTypeVer, the trTypeHor or trTypeVer having a value of 0 may be configured as DCT2, and the trTypeHor or trTypeVer having a value of 1 may be configured as DCT7. The trTypeHor or trTypeVer having a value of 2 may be configured as DCT8.

Further, for example, in order to indicate any one of plural transform kernel sets, an MTS index may be encoded, and MTS index information may be signaled to the decoding apparatus. Here, the MTS index may be represented as tu_mts_idx syntax element or mts_idx syntax element. For example, if the MTS index is 0, it may represent that values of trTypeHor and trTypeVer are all 0, and if the MTS index is 1, it may represent that the values of trTypeHor and trTypeVer are all 1. If the MTS index is 2, it may represent that the value of trTypeHor is 2 and the value of trTypeVer is 1, and if the MTS index is 3, it may represent that the value of trTypeHor is 1 and the value of trTypeVer is 2. If the MTS index is 4, it may represent that the values of trTypeHor and trTypeVer are all 2. For example, a transform kernel set according to the MTS index may be represented as in the following table.

TABLE 1

| MTS index | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing secondary transform based on the (primary) transform coefficients (S420). The primary transform may be a transform of the spatial domain into the frequency domain, and the secondary transform may represent a transform into a more compressive expression by using a correlation existing between the (primary) transform coefficients.

For example, the secondary transform may include a non-separable transform. In this case, the secondary transform may be called a non-separable secondary transform (NSST) or a mode-dependent non-separable secondary transform (MDNSST). The non-separable secondary transform may represent a transform for generating modified transform coefficients (or secondary transform coefficients) for the residual signal by secondarily transforming the (primary) transform coefficients derived through the primary transform based on a non-separable transform matrix. Here, the vertical transform and the horizontal transform may not be separately (or independently) applied with respect to the (primary) transform coefficients based on the non-separable transform matrix, but may be applied all at once.

In other words, the non-separable secondary transform may represent a transform method for rearranging, for example, two-dimensional signals (transform coefficients) to one-dimensional signal through a specifically determined direction (e.g., row-first direction or column-first direction), without separating the (primary) transform coefficients into vertical components and horizontal components, and then generating modified transform coefficients (or secondary transform coefficients) based on the non-separable transform matrix.

For example, the row-first direction (or order) may represent an arrangement of an M×N block in a line in the order of a first row to an N-th row, and the column-first direction (or order) may represent an arrangement of an M×N block in a line in the order of a first column to an M-th column. Here, M and N may represent a width (W) and a height (H) of the block, and may be all positive integers.

For example, the non-separable secondary transform may be applied to a top-left area of the block composed of (primary) transform coefficients (hereinafter, transform coefficient block). For example, if the width (W) and the height (H) of the transform coefficient block are all equal to or larger than 8, 8×8 non-separable secondary transform may be applied to the top-left 8×8 area of the transform coefficient block. Further, if the width (W) and the height (H) of the transform coefficient block are all equal to or larger than 4 and smaller than 8, 4×4 non-separable secondary transform may be applied to the top-left min (8, W)×min (8, H) area of the transform coefficient block. However, embodiments are not limited thereto, and for example, even if a condition that the width (W) and the height (H) of the transform coefficient block are all equal to or larger than 4 is satisfied, the 4×4 non-separable secondary transform may be applied to the top-left min (8, W)×min (8, H) area of the transform coefficient block.

Specifically, for example, in case that a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

For example, the vector form of the X may be represented as follows.

$$\vec{X} = [X_{00}, X_{01}, X_{02}, X_{03}, X_{10}, X_{11}, X_{12}, X_{13}, X_{20}, X_{21}, X_{22}, X_{23}, X_{30}, X_{31}, X_{32}, X_{33}]^T$$ [Equation 2]

Referring to Equation 2, $\vec{X}$ may represent the vector X, and the two-dimensional block of the X in Equation 1 may be rearranged and represented as the one-dimensional vector in accordance with the row-first order.

In this case, the secondary non-separable transform may be calculated as follows.

$$\vec{F} = T \cdot \vec{X}$$ [Equation 3]

Here, $\vec{F}$ may represent a transform coefficient vector, and T may represent 16×16 (non-separable) transform matrix.

Based on Equation 3, $\vec{F}$ having a size of 16×1 may be derived, and $\vec{F}$ may be reorganized as 4×4 block through a scan order (horizontal, vertical, or diagonal). However, the above-described calculation is exemplary, and in order to reduce calculation complexity of the non-separable secondary transform, hypercube-givens transform (HyGT) and the like may be used to calculate the non-separable secondary transform.

Meanwhile, in the non-separable secondary transform, a transform kernel (or transform core or transform type) may be selected in a mode dependent manner. Here, the mode may include an intra prediction mode and/or an inter prediction mode.

For example, as described above, the non-separable secondary transform may be performed based on the 8×8 transform or 4×4 transform determined based on the width (W) and the height (H) of the transform coefficient block. For example, if the W and H are all equal to or larger than 8, the 8×8 transform may represent a transform that can be applied to the 8×8 area included inside the corresponding transform coefficient block, and the 8×8 area may be the top-left 8×8 area inside the corresponding transform coefficient block. Further, similarly, if the W and H are all equal to or larger than 4, the 4×4 transform may represent a transform that can be applied to the 4×4 area included inside the corresponding transform coefficient block, and the 4×4 area may be the top-left 4×4 area inside the corresponding transform coefficient block. For example, an 8×8 transform kernel matrix may be a 64×64/16×64 matrix, and a 4×4 transform kernel matrix may be a 16×16/8×16 matrix.

In this case, for mode-based transform kernel selection, two non-separable secondary transform kernels per transform set for the non-separable secondary transform may be configured with respect to all of the 8×8 transform and the 4×4 transform, and four transform sets may be provided. That is, four transform sets may be configured with respect to the 8×8 transform, and four transform sets may be configured with respect to the 4×4 transform. In this case, each of the four transform sets for the 8×8 transform may include two 8×8 transform kernels, and each of the four transform sets for the 4×4 transform may include two 4×4 transform kernels.

However, the size of the transform, the number of sets, and the number of transform kernels in the set are exemplary, and a size excluding the 8×8 or 4×4 may be used, or n sets may be configured, or k transform kernels may be included in each set. Here, n and k may be positive integers.

For example, the transform set may be called an NSST set, and the transform kernel in the NSST set may be called an NSSAT kernel. For example, selection of a specific set among the transform sets may be performed based on the intra prediction mode of the target block (CU or subblock).

For example, the intra prediction mode may include two non-directional or non-angular intra prediction modes and 65 directional or angular intra prediction modes. The non-directional intra prediction modes may include No. 0 planar intra prediction mode and No. 1 DC intra prediction mode, and the directional intra prediction modes may include 65 (No. 2 to No. 66) intra prediction modes. However, this is exemplary, and the embodiment according to the present document may be applied even to a case that a different number of intra prediction modes is provided. Meanwhile, in some cases, No. 67 intra prediction mode may be further used, and the No. 67 intra prediction mode may represent a linear model (LM) mode.

Figure 5:
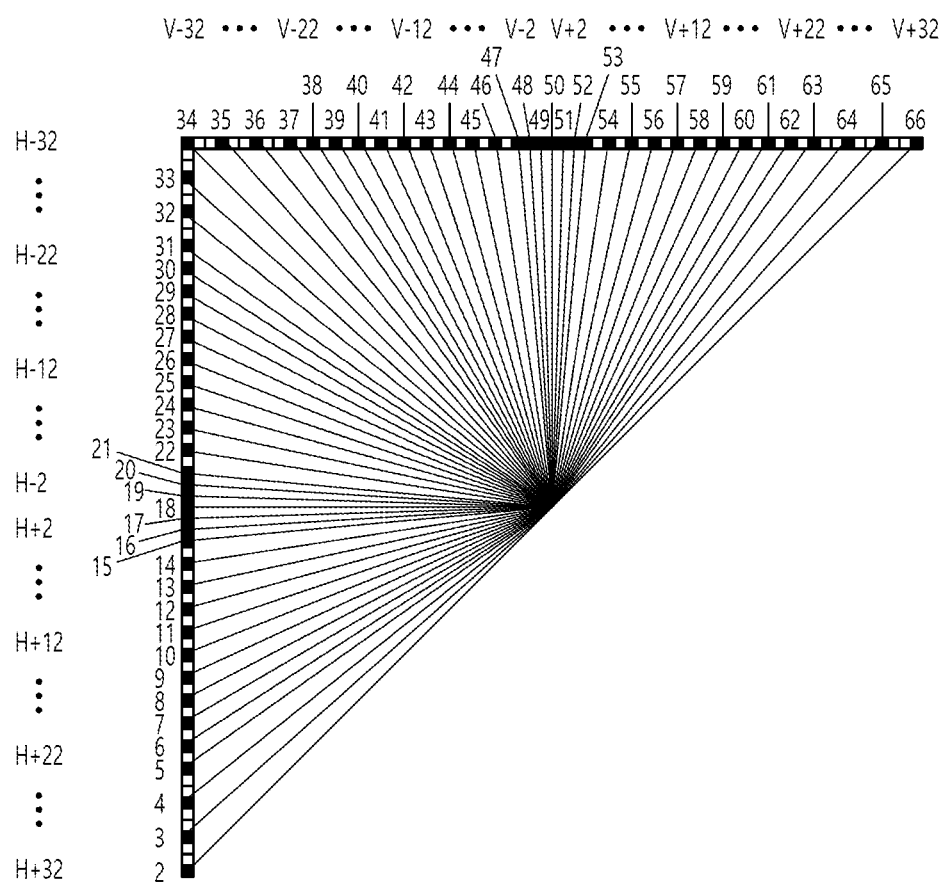
FIG. 5 exemplarily illustrates intra directional modes in 65 prediction directions.

FIG. 5 exemplarily illustrates intra directional modes in 65 prediction directions.

Referring to FIG. 5, modes may be divided into intra prediction modes having horizontal directionality and intra prediction modes having vertical directionality around No. 34 intra prediction mode having top-left diagonal prediction direction. In FIG. 5, H and V may mean the horizontal directionality and the vertical directionality, respectively, and numerals of −32 to 32 may represent displacements in the unit of 1/32 on a sample grid position. This may represent an offset for a mode index value.

For example, No. 2 to No. 33 intra prediction modes may have the horizontal directionality, and No. 34 to No. 66 intra prediction modes have the vertical directionality. Meanwhile, technically speaking, No. 34 intra prediction mode may be considered to have neither the horizontal directionality nor the vertical directionality, but may be classified to belong to the horizontal directionality from the viewpoint of determining the transform set of the secondary transform. This is because input data is transposed and used with respect to the vertical direction modes being symmetrical around the No. 34 intra prediction mode, and an input data arrangement method for the horizontal direction mode is used with respect to the No. 34 intra prediction mode. Here, transposing of the input data may mean configuration of N×M data in a manner that rows become columns and columns become rows with respect to two-dimensional block data M×N.

Further, No. 18 intra prediction mode and No. 50 intra prediction mode may represent a horizontal intra prediction mode and a vertical intra prediction mode, respectively, and No. 2 intra prediction mode may be called top-right diagonal intra prediction mode since prediction is made in the top-right direction with a left reference pixel. In the same context, No. 34 intra prediction mode may be called a bottom-right diagonal intra prediction mode, and No. 66 intra prediction mode may be called a bottom-left diagonal intra prediction mode.

Meanwhile, if it is determined that a specific set is used for non-separable transform, one of k transform kernels in the specific set may be selected through the non-separable secondary transform index. For example, the encoding apparatus may derive the non-separable secondary transform index representing a specific transform kernel based on a rate-distortion (RD) check, and may signal the non-separable secondary transform index to the decoding apparatus. For example, the decoding apparatus may select one of the k transform kernels in the specific set based on the non-separable secondary transform index. For example, an NSST index having a value of 0 may represent a first non-separable secondary transform kernel, an NSST index having a value of 1 may represent a second non-separable secondary transform kernel, and an NSST index having a value of 2 may represent a third non-separable secondary transform kernel. Alternatively, an NSST index having a value of 0 may represent that the first non-separable secondary transform is not applied to the target block, and an NSST index having a value of 1 to 3 may indicate the three transform kernels as above.

The transformer may perform the non-separable secondary transform based on the selected transform kernels, and may obtain modified (secondary) transform coefficients. The modified transform coefficients may be derived as quantized transform coefficients through the above-described quantizer, and may be encoded to be signaled to the decoding apparatus and may be transferred to the dequantizer/inverse transformer in the encoding apparatus.

Meanwhile, if the secondary transform is omitted as described above, the (primary) transform coefficients that are outputs of the primary (separable) transform may be derived as the quantized transform coefficients through the quantizer as described above, and may be encoded to be signaled to the decoding apparatus and may be transferred to the dequantizer/inverse transformer in the encoding apparatus.

Referring again to FIG. 4, the inverse transformer may perform a series of procedures in reverse order to the procedures performed by the above-described transformer. The inverse transformer may receive (dequantized) transform coefficients, derive (primary) transform coefficients by performing secondary (inverse) transform (S450), and obtain a residual block (residual samples) by performing primary (inverse) transform with respect to the (primary) transform coefficients (S460). Here, the primary transform coefficients may be called modified transform coefficients on the inverse transformer side. As described above, the encoding apparatus and/or the decoding apparatus may generate a reconstructed block based on the residual block and a predicted block, and may generate a reconstructed picture based on this.

Meanwhile, the decoding apparatus may further include a secondary inverse transform application/non-application determiner (or element for determining whether to apply the secondary inverse transform) and a secondary inverse transform determiner (or element for determining the secondary inverse transform). For example, the secondary inverse transform application/non-application determiner may determine whether to apply the secondary inverse transform. For example, the secondary inverse transform may be NSST or RST, and the secondary inverse transform application/non-application determiner may determine whether to apply the secondary inverse transform based on a secondary transform flag parsed or obtained from a bitstream. Alternatively, for example, the secondary inverse transform application/non-application determiner may determine whether to apply the secondary inverse transform based on the transform coefficient of the residual block.

The secondary inverse transform determiner may determine the secondary inverse transform. In this case, the secondary inverse transform determiner may determine the secondary inverse transform being applied to the current block based on the NSST (or RST) transform set designated in accordance with the intra prediction mode. Alternatively, a secondary transform determination method may be determined depending on a primary transform determination method. Alternatively, various combinations of the primary transform and the secondary transform may be determined in accordance with the intra prediction mode. For example, the secondary inverse transform determiner may determine an area to which the secondary inverse transform is applied based on the size of the current block.

Meanwhile, if the secondary (inverse) transform is omitted as described above, the residual block (residual samples) may be obtained by receiving the (dequantized) transform coefficients and performing the primary (separable) inverse transform. As described above, the encoding apparatus and/ or the decoding apparatus may generate a reconstructed block based on the residual block and the predicted block, and may generate a reconstructed picture based on this.

Meanwhile, in the present document, in order to reduce a computation amount and a memory requirement amount being accompanied by the non-separable secondary transform, a reduced secondary transform (RST) having a reduced size of the transform matrix (kernel) may be applied on the concept of NSST.

In the present document, the RST may mean a (simplification) transform being performed with respect to the residual samples for the target block based on the transform matrix of which the size is reduced in accordance with a simplification factor. In case of performing this, the computation amount being required during the transform may be reduced due to the reduction of the size of the transform matrix. That is, the RST may be used to solve the computation complexity issue occurring during the transform of a block having a large size or non-separable transform.

For example, the RST may be referred to as various terms, such as reduced transform, reduced secondary transform, reduction transform, simplified transform, or simple transform, and names to which the RST is referred are not limited to the enumerated examples. Further, the RST is mainly performed in a low-frequency domain including coefficients that are not 0 in the transform block, and thus may be called a low-frequency non-separable transform (LFNST).

Meanwhile, in case that the secondary inverse transform is performed based on the RST, the inverse transformer 235 of the encoding apparatus 200 and the inverse transformer 322 of the decoding apparatus 300 may include an inverse RST unit deriving modified transform coefficients based on the inverse RST for the transform coefficients, and an inverse primary transformer deriving residual samples for the target block based on the inverse primary transform for the modified transform coefficients. The inverse primary transform means an inverse transform of the primary transform having been applied to the residual. In the present document, derivation of the transform coefficients based on the transform may mean derivation of the transform coefficients by applying the corresponding transform.

Figure 6:
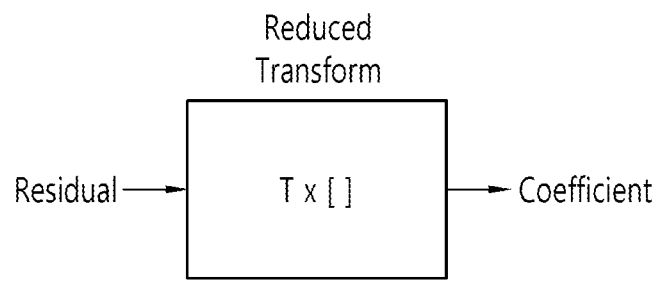
FIGS. 6 and 7 are diagrams explaining RST according to an embodiment of the present document.
Figure 7:
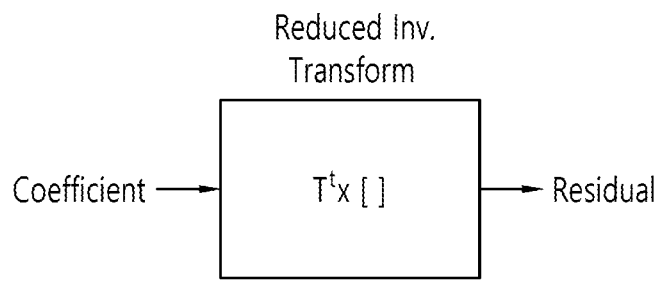

FIGS. 6 and 7 are diagrams explaining RST according to an embodiment of the present document.

For example, FIG. 6 may be a figure explaining that a forward reduced transform is applied, and FIG. 7 may be a figure explaining that an inverse reduced transform is applied. In the present document, the target block may represent the current block, a residual block, or a transform block of which coding is performed.

For example, in the RST, an N-dimensional vector may be mapped on an R-dimensional vector located in another space, and a reduced transform matrix may be determined. Here, N and R may be positive integers, and R may be smaller than N. N may mean a square of a length of one side of a block to which transform is applied or the total number of transform coefficients corresponding to the block to which the transform is applied, and a simplification factor may mean an R/N value. The simplification factor may be referred to as various terms, such as reduced factor, reduction factor, simplified factor, or simple factor. Meanwhile, R may be referred to as a reduced coefficient, and in some cases, the simplification factor may mean the R. Further, in some cases, the simplification factor may mean the N/R value.

For example, the simplification factor or the reduced coefficient may be signaled through the bitstream, but is not limited thereto. For example, predefined values for the simplification factor or the reduced coefficient may be stored in the encoding apparatus 200 and the decoding apparatus 300, and in this case, the simplification factor or the reduced coefficient may not be separately signaled.

For example, the size (R×N) of the simplification transform matrix may be smaller than the size (N×N) of a regular transform matrix, and may be defined as in the following equation.

$$T_{R \times N} = \begin{bmatrix} t_{11} & t_{12} & t_{13} & \cdots & t_{1N} \\ t_{21} & t_{22} & t_{23} & & t_{2N} \\ \vdots & & \ddots & & \\ t_{R1} & t_{R2} & t_{R3} & \cdots & t_{RN} \end{bmatrix} \quad \text{[Equation 4]}$$

For example, the matrix T in the reduced transform block illustrated in FIG. 6 may represent the matrix $T_{R \times N}$ of Equation 4. As shown in FIG. 6, in case that the residual samples for the target block is multiplied by the simplification transform matrix $T_{R \times N}$, the transform coefficients for the target block may be derived.

For example, in case that the size of the block to which the transform is applied is 8×8, and R is 16 (i.e., R/N=16/64=¼), the RST according to FIG. 6 may be expressed by a matrix operation as in Equation 5 below. In this case, the memory and the multiplication operation may be reduced to about ¼ by the simplification factor.

In the present document, the matrix operation may be understood as an operation of obtaining a column vector by placing the matrix on the left side of the column vector and multiplying the matrix and the column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & \ddots & & \\ t_{16,1} & t_{16,2} & t_{R3} & \cdots & t_{16,64} \end{bmatrix} \times \begin{bmatrix} r_1 \\ r_2 \\ \vdots \\ r_{64} \end{bmatrix} \quad \text{[Equation 5]}$$

In Equation 5, $r_1$ to $r_{64}$ may represent residual samples for the target block. Alternatively, for example, they may be transform coefficients generated by applying the primary transform. Based on the result of the operation of Equation 5, transform coefficients $c_i$ for the target block may be derived.

For example, in case that R is 16, transform coefficients $c_1$ to $c_{16}$ for the target block may be derived. If the transform matrix having a size of 64×64 (N×N) through application of a regular transform rather than the RST is multiplied by the residual samples having a size of 64×1 (N×1), 64 (N) transform coefficients for the target block may be derived, but since the RST is applied, only 16 (N) transform coefficients for the target block may be derived. Since the total number of transform coefficients for the target block is reduced from N to R, the amount of data that the encoding apparatus 200 transmits to the decoding apparatus 300 may be reduced, and thus transmission efficiency between the encoding apparatus 200 and the decoding apparatus 300 may be increased.

In consideration of the size of the transform matrix, since the size of the regular transform matrix is 64×64 (N×N), and the size of the simplification transform matrix is reduced to 16×64 (R×N), the memory usage when performing the RST can be reduced in an R/N ratio as compared with a case that the regular transform is performed. Further, as compared with the number (N×N) of multiplication operations when using the regular transform matrix, the usage of the simplification transform matrix can reduce the number of multiplication operations (R×N) in the R/N ratio.

In an embodiment, the transformer 232 of the encoding apparatus 200 may derive the transform coefficients for the target block by performing primary transform and RST-based secondary transform of the residual samples for the target block. The transform coefficients may be transferred to the inverse transformer of the decoding apparatus 300, and the inverse transformer 322 of the decoding apparatus 300 may derive the modified transform coefficients based on inverse reduced secondary transform (RST) for the transform coefficients, and may derive the residual samples for the target block based on the inverse primary transform of the modified transform coefficients.

The size of the inverse RST matrix $T_{N \times R}$ according to an embodiment may be N×R that is smaller than the size N×N of the regular inverse transform matrix, and may be in transpose relationship with the simplification transform matrix $T_{R \times N}$ illustrated in Equation 4.

The matrix Tt in the reduced inverse transform block illustrated in FIG. 7 may represent an inverse RST matrix $T_{R \times N}^T$. Here, the superscript T may represent the transpose. As shown in FIG. 7, in case that the transform coefficients for the target block is multiplied by the inverse RST matrix $T_{R \times N}^T$, the modified transform coefficients for the target block or the residual samples for the target block may be derived. The inverse RST matrix $T_{R \times N}^T$ may be expressed as $(T_{R \times N})^T_{N \times R}$.

More specifically, in case that the inverse RST is applied as the secondary inverse transform, the modified transform coefficients for the target block may be derived by multiplying the transform coefficients for the target block by the inverse RST matrix $T_{R \times N}^T$. Meanwhile, the inverse RST may be applied as the inverse primary transform, and in this case, the residual samples for the target block may be derived by multiplying the transform coefficients for the target block by the inverse RST matrix $T_{R \times N}^T$.

In an embodiment, in case that the size of the block to which the inverse transform is applied is 8×8, and R is 16 (i.e., R/N=16/64=¼), the RST according to FIG. 7 may be expressed by a matrix operation as in Equation 6 below.

$$\begin{bmatrix} t_{1,1} & t_{2,1} & \cdots & t_{16,1} \\ t_{2,1} & t_{2,2} & \cdots & t_{16,2} \\ t_{1,3} & t_{2,3} & \cdots & t_{16,3} \\ \vdots & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$ [Equation 6]

In Equation 6, $c_1$ to $c_{16}$ may represent transform coefficients for the target block. $r_j$ representing the modified transform coefficients for the target block or the residual samples for the target block may be derived based on the result of the operation of Equation 6. That is, $r_1$ to $r_N$ representing the modified transform coefficients for the target block or the residual samples for the target block may be derived.

In consideration of the size of the inverse transform matrix, since the size of the regular inverse transform matrix is 64×64 (N×N), and the size of the simplification inverse transform matrix is reduced to 64×16 (N×R), the memory usage when performing the inverse RST can be reduced in an R/N ratio as compared with a case that the regular inverse transform is performed. Further, as compared with the number (N×N) of multiplication operations when using the regular inverse transform matrix, the usage of the simplification inverse transform matrix can reduce the number of multiplication operations (N×R) in the R/N ratio.

Meanwhile, transform sets may be configured and applied even with respect to 8×8 RST. That is, the corresponding 8×8 RST may be applied in accordance with the transform set. Since one transform set is composed of two or three transform kernels in accordance with the intra prediction mode, it may be configured to select one of four transforms at maximum including even a case that the secondary transform is not applied. In the transform when the secondary transform is not applied, it may be considered that an identity matrix has been applied. If it is assumed that an index of 0, 1, 2, or 3 is given for four transforms (e.g., No. 0 index may be allocated to a case that the identity matrix, that is, secondary transform, is not applied), the transform to be applied may be designated by signaling a syntax element that is an NSST index to every transform coefficient block. That is, through the NSST index, 8×8 NSST may be designated for an 8×8 top-left block, and in the RST configuration, 8×8 RST may be designated. The 8×8 NSST and the 8×8 RST may represent transforms capable of being applied to the 8×8 area included inside the corresponding transform coefficient block in case that the W and the H of the target block that becomes the target of the transform are all equal to or larger than 8, and the 8×8 area may be the top-left 8×8 area inside the corresponding transform coefficient block. Similarly, the 4×4 NSST and the 4×4 RST may represent transforms capable of being applied to the 4×4 area included inside the corresponding transform coefficient block in case that the W and the H of the target block are all equal to or larger than 4, and the 4×4 area may be the top-left 4×4 area inside the corresponding transform coefficient block.

Meanwhile, for example, the encoding apparatus may derive the bitstream by encoding the value of the syntax element or the quantized values of the transform coefficient for the residual based on various coding methods, such as exponential Golomb, context-adaptive variable length coding (CAVLC), context-adaptive binary arithmetic coding (CABAC), and the like. Further, the decoding apparatus may derive the value of the syntax element or the quantized values of the transform coefficient for the residual based on various coding methods, such as exponential Golomb encoding, CAVLC, CABAC, and the like.

For example, the above-described coding methods may be performed as the contents to be described later.

Figure 8:
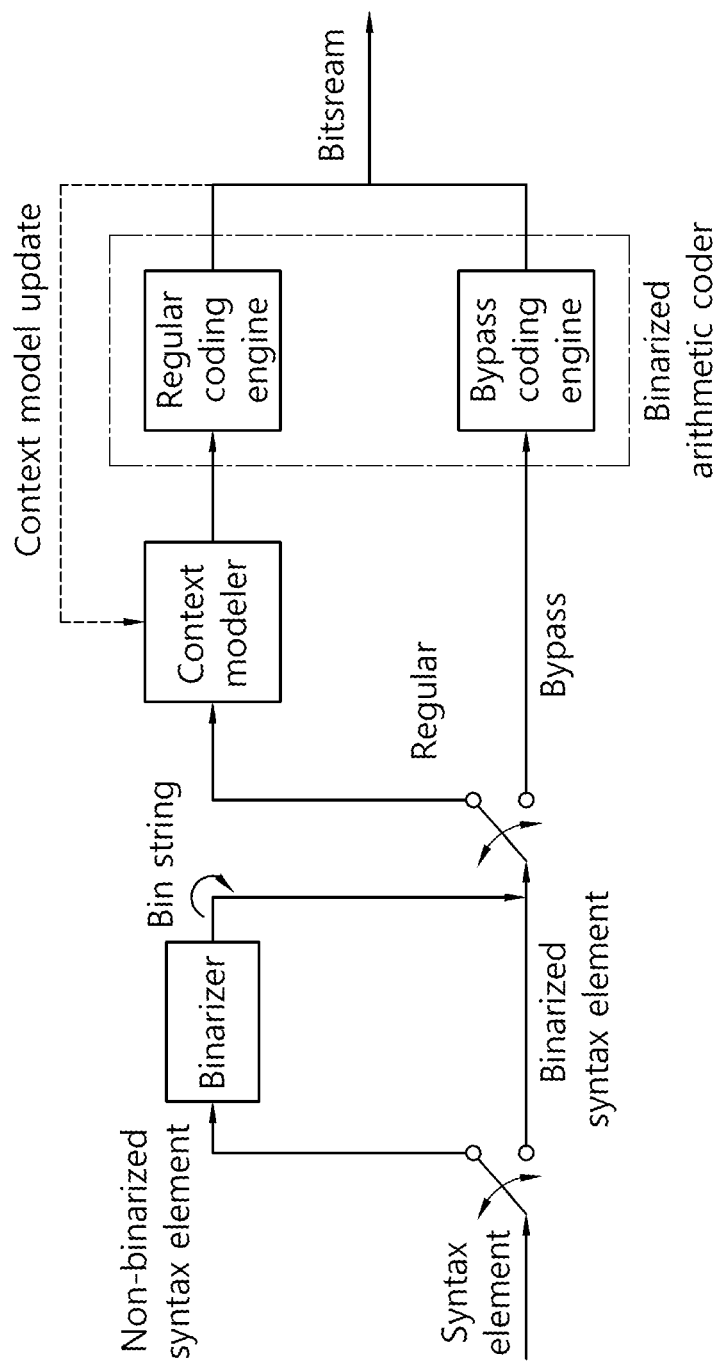
FIG. 8 exemplarily illustrates context-adaptive binary arithmetic coding (CABAC) for encoding syntax elements.

FIG. 8 exemplarily illustrates context-adaptive binary arithmetic coding (CABAC) for encoding a syntax element.

For example, in a CABAC coding process, if an input signal is a syntax element that is not a binary value, a value of the input signal may be transformed into a binary value through binarization. Further, if the input signal is already the binary value (i.e., if the value of the input signal is the binary value), the binarization may not be performed, but the input signal may be used as it is. Here, each binary number 0 or 1 constituting the binary value may be called a bin. For example, if a binary string after the binarization is 110, each of 1, 1, and 0 may be represented as one bin. The bin(s) for one syntax element may represent the value of the syntax element. The binarization may be based on various binarization method, such as a truncated rice binarization process or a fixed-length binarization process, and the binarization method for a target syntax element may be predefined. The binarization procedure may be performed by a binarizer in an entropy encoder.

Thereafter, the binarized bins of the syntax element may be input to a regular coding engine or a bypass coding engine. The regular coding engine of the encoding apparatus may allocate a context model that reflects a probability value with respect to the corresponding bin, and encode the corresponding bin based on the allocated context model. The regular coding engine of the encoding apparatus may update the context model for the corresponding bin after performing coding with respect to the respective bins. The bins being coded as the above-described contents may be represented as context-coded bins.

Meanwhile, in case that the binarized bins of the syntax element are input to the bypass coding engine, they may be coded as follows. For example, the bypass coding engine of the encoding apparatus may omit a procedure for estimating probability with respect to the input bin and a procedure for updating a probability model having been applied to the bin after the coding. In case that the bypass coding is applied, the encoding apparatus may code the input bin by applying regular probability distribution instead of allocating the context model, and through this, the coding speed can be improved. The bin being coded as the above-described contents may be represented as a bypass bin.

Entropy decoding may represent a process for performing the same process as the above-described entropy encoding in reverse order.

The decoding apparatus (entropy decoder) may decode encoded image/video information. The image/video information may include partitioning-related information, prediction-related information (e.g., inter/intra prediction division information, intra prediction mode information, inter prediction mode information, and the like), residual information, or in-loop filtering-related information, or may include various syntax elements thereabout. The entropy coding may be performed in the unit of a syntax element.

The decoding apparatus may perform binarization of target syntax elements. Here, the binarization may be based on various binarization methods, such as a truncated rice binarization process or a fixed-length binarization process, and the binarization method for the target syntax element may be predefined. The decoding apparatus may derive available bin strings (bin string candidates) for available values of the target syntax elements through the binarization procedure. The binarization procedure may be performed by the binarizer in the entropy decoder.

The decoding apparatus may compare the derived bin string with available bin strings for the corresponding syntax elements while sequentially decoding or parsing the respective bins for the target syntax elements from input bit(s) in the bitstream. If the derived bin string is equal to one of the available bin strings, the value corresponding to the corresponding bin string is derived as the value of the corresponding syntax element. If not, the decoding apparatus may re-perform the above-described procedure after further parsing the next bit in the bitstream. Through such a process, it is possible to perform signaling of specific information (or specific syntax element) in the bitstream using a variable length bit even without using a start bit or an end bit of the corresponding information. Through this, a relatively smaller bit may be allocated with respect to a smaller value, and thus an overall coding efficiency can be enhanced.

The decoding apparatus may perform context model-based or bypass-based decoding of the respective bins in the bin string from the bitstream based on an entropy coding technique, such as CABAC or CAVLC.

In case that the syntax element is decoded based on the context model, the decoding apparatus may receive the bin corresponding to the syntax element through the bitstream, may determine a context model using the syntax element and decoding information of the decoding target block or the neighboring block or symbol/bin information decoded in the previous stage, and may derive the syntax element value by performing arithmetic decoding of the bin through prediction of the probability of occurrence of the received bin in accordance with the determined context model. Thereafter, the context model of the bin being next decoded may be updated based on the determined context model.

The context model may be allocated and updated by context-coded (regularly coded) bins, and the context model may be indicated based on context index (ctxIdx) or context index increment (ctxInc). CtxIdx may be derived based on ctxInc. Specifically, for example, the ctxIdx representing the context model for each of the regularly coded bins may be derived by the sum of ctxInc and context index offset (ctxIdxOffset). For example, the ctxInc may be differently derived by bins. The ctxIdxOffset may be represented as the lowest value of the ctxIdx. Generally, the ctxIdxOffset may be a value being used to distinguish the same from context models for other syntax elements, and the context model for one syntax element may be divided or derived based on the ctxInc.

In the entropy encoding procedure, it may be determined whether to perform encoding through the regular coding engine or to perform encoding through the bypass coding engine, and accordingly, a coding path may be switched. Entropy decoding may perform the same process as the entropy encoding in reverse order.

Meanwhile, for example, in case that the syntax element is bypass-decoded, the decoding apparatus may receive the bin corresponding to the syntax element through the bitstream, and may decode the input bin by applying regular probability distribution. In this case, the decoding apparatus may omit a procedure of deriving the context model of the syntax element and a procedure of updating the context model applied to the bin after the decoding.

As described above, the residual sample may be derived as quantized transform coefficients through the transform and quantization processes. The quantized transform coefficients may be called transform coefficients. In this case, the transform coefficients in the block may be signaled in the form of residual information. The residual information may include a syntax or a syntax element about residual coding. For example, the encoding apparatus may encode the residual information, and may output the same in the form of a bitstream, and the decoding apparatus may decode the residual information from the bitstream, and may derive the residual (quantized) transform coefficients. As described later, the residual information may include syntax elements representing whether the transform has been applied to the corresponding block, where is the location of the last effective transform coefficient in the block, whether an effective transform coefficient exists in the subblock, or how the size/sign of the effective transform coefficient is.

Meanwhile, for example, the predictor in the encoding apparatus of FIG. 2 or the predictor in the decoding apparatus of FIG. 3 may perform intra prediction. The intra prediction will be described in more detail as follows.

The intra prediction may represent a prediction for generating prediction samples for the current block based on reference samples in the picture (hereinafter, current picture) to which the current block belongs. In case that the intra prediction is applied to the current block, neighboring reference samples to be used for the intra prediction of the current block may be derived. The neighboring reference samples of the current block may include a sample adjacent to a left boundary of the current block having a size of nW×nH, total 2×nH samples neighboring the bottom-left, a sample adjacent to the top boundary of the current block, total 2×nW samples neighboring the top-right, and one sample neighboring the top-left of the current block. Alternatively, the neighboring reference samples of the current block may include top neighboring sample of plural columns and left neighboring sample of plural rows. Alternatively, the neighboring reference samples of the current block may include total nH samples adjacent to the right boundary of the current block having a size of nW×nH, total nH samples adjacent to the right boundary of the current block, total nW samples adjacent to the bottom boundary of the current block, and one sample neighboring the bottom-right of the current block.

However, some of the neighboring reference samples of the current block may have not yet been decoded or may not be available. In this case, the decoder may configure the neighboring reference samples to be used for the prediction through substitution of available samples for the unavailable samples. Alternatively, the neighboring reference samples to be used for the prediction may be configured through interpolation of the available samples.

In case that the neighboring reference samples are derived, (i) a prediction sample may be induced based on an average or interpolation of the neighboring reference samples of the current block, and (ii) a prediction sample may be induced based on a reference sample existing in a specific (prediction) direction with respect to the prediction sample among the neighboring reference samples of the current block. The case of (i) may be called a non-directional mode or a non-angular mode, and the case of (ii) may be called a directional mode or an angular mode.

Further, the prediction sample may be generated through interpolation between the first neighboring sample and the second neighboring sample located in an opposite direction to the prediction direction of the intra prediction mode of the current block based on the prediction sample of the current block among the neighboring reference samples. The above-described case may be called a linear interpolation intra prediction (LIP). Further, chroma prediction samples may be generated based on luma samples using a linear model. This case may be called a linear model (LM) mode. Alternatively, the prediction sample of the current block may be derived by deriving a temporary prediction sample of the current block based on the filtered neighboring reference samples and performing weighted sum of the temporary prediction sample and at least one reference sample derived in accordance with the intra prediction mode among the non-filtered neighboring reference samples. The above-described case may be called a position dependent intra prediction (PDPC). Alternatively, the intra prediction coding may be performed in a method for deriving a prediction sample using a reference sample located in the prediction direction in reference sample line having the highest prediction accuracy through selection of the corresponding line among neighboring multi-reference sample lines of the current block, and for indicating (signaling) the reference sample line used at that time to the decoding apparatus. The above-described case may be called a multi-reference line (MRL) intra prediction or MRL-based intra prediction. Further, in performing the intra prediction based on the same intra prediction modes through division of the current block into vertical or horizontal sub-partitions, the neighboring reference samples may be derived and used in the unit of the sub-partition. That is, the intra prediction mode for the current block may be equally applied to the sub-partitions, and in this case, since the neighboring reference samples are derived and used in the unit of the sub-partition, the intra prediction performance can be enhanced in some cases. This prediction method may be called an intra sub-partitions (ISP) or ISP-based intra prediction.

The above-described intra prediction methods may be called an intra prediction type in distinction from the intra prediction mode. The intra prediction type may be called various terms, such as an intra prediction technique or an additional intra prediction mode. For example, the intra prediction type (or additional intra prediction mode) may include at least one of LIP, PDPC, MRL, and ISP as described above. A general intra prediction method excluding the specific intra prediction type, such as the LIP, PDPC, MRL, or ISP, may be called a normal intra prediction type. In case that the above-described specific intra prediction type is not applied, the normal intra prediction type may be generally applied, and the prediction may be performed based on the above-described intra prediction mode. Meanwhile, as needed, a post-filtering for the derived prediction sample may be performed.

In other words, the intra prediction procedure may include intra prediction mode/type determination, neighboring reference sample derivation, and intra prediction mode/type based prediction sample derivation. Further, as needed, a post-filtering for the derived prediction sample may be performed.

Figure 9:
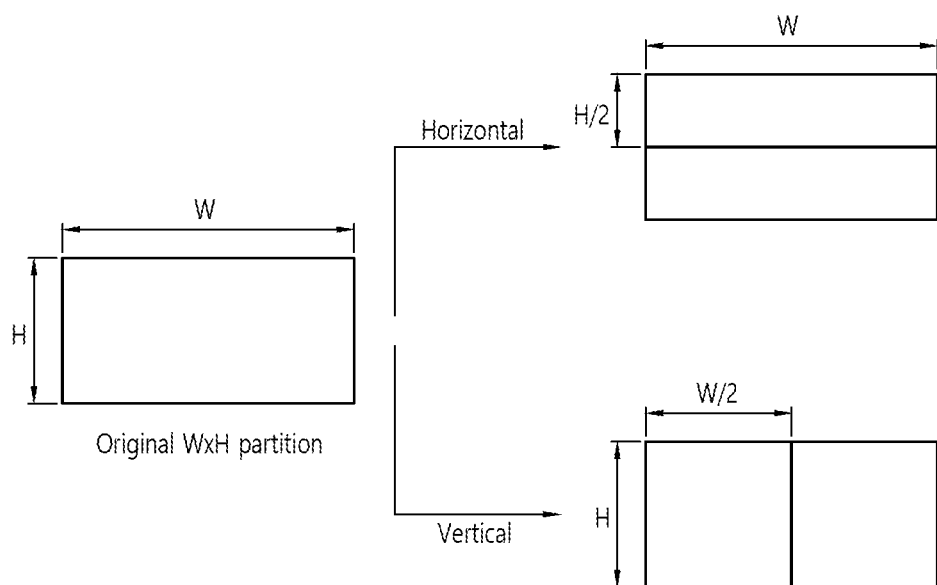
FIGS. 9 and 10 illustrates an example in which a block to which ISP is applied is divided into subblocks based on the size of the block.
Figure 10:
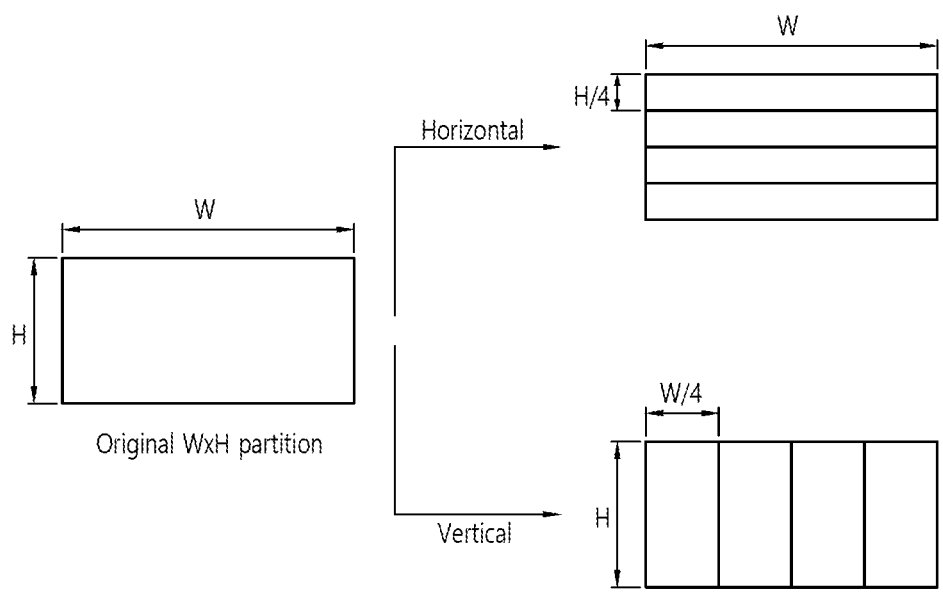

FIGS. 9 and 10 illustrates an example in which a block to which ISP is applied is divided into subblocks based on the size of the block.

Meanwhile, among the above-described intra prediction types, the ISP may divide the current block in a horizontal direction or a vertical direction, and may perform intra prediction in the unit of divided blocks. That is, the ISP may derive subblocks by dividing the current block in the horizontal direction or vertical direction, and may perform intra prediction for each of the subblocks. In this case, a reconstructed block may be generated through performing of encoding/decoding in the unit of the divided subblock, and the reconstructed block may be used as a reference block of the next divided subblock. Here, the subblock may be called an intra sub-partition.

For example, in case that the ISP is applied, the current block may be divided into two or four subblocks in the vertical or horizontal direction based on the size of the current block.

Referring to FIG. 9, when the size of the current block is 4×8 or 8×4, the current block may be divided into two sub-blocks. Also, referring to FIG. 10, when the size of the current block is a size other than 4×4, 4×8, and 8×4 (ie, larger than the 4×8 or 8×4 size), the current block may be divided into 4 sub-blocks.

For example, in order to apply the ISP, a flag representing whether to apply the ISP may be transmitted in the unit of a block, and in case that the ISP is applied to the current block, a flag representing whether the partitioning type is horizontal or vertical, that is, whether the partitioning direction is a horizontal direction or vertical direction, may be encoded/decoded. The flag representing whether to apply the ISP may be called an ISP flag, and the ISP flag may be represented as an intra_subpartitions_mode_flag syntax element. Further, the flag representing the partitioning type may be called an ISP partitioning flag, and the ISP partitioning flag may be represented as an intra_subpartitions_split_flag syntax element.

For example, by the ISP flag or the ISP partitioning flag, information representing that the ISP is not applied to the current block (IntraSubPartitionsSplitType==ISP_NO_SPLIT), information representing partitioning in the horizontal direction (IntraSubPartitionsSplitType==ISP_HOR_SPLIT), information representing partitioning in the vertical direction (IntraSubPartitionsSplitType==ISP_VER_SPLIT) may be represented. For example, the ISP flag or the ISP partitioning flag may be called ISP-related information on sub-partitioning of the block.

Meanwhile, in addition to the above-described intra prediction types, an affine linear weighted intra prediction (ALWIP) may be used. The ALWIP may be called a linear weighted intra prediction (LWIP), a matrix weighted intra prediction (MWIP), or a matrix based intra prediction (MIP). In case that the ALWIP is applied to the current block, i) using neighboring reference samples of which an averaging procedure has been performed, ii) a matrix-vector-multiplication procedure may be performed, and iii) as needed, prediction samples for the current block may be derived by further performing a horizontal/vertical interpolation procedure.

The intra prediction modes used for the ALWIP may be the above-described LIP, PDPC, MRL, or ISP intra prediction, but may be configured differently from the intra prediction modes used in the normal intra prediction. The intra prediction mode for the ALWIP may be called an ALWIP mode. For example, in accordance with the intra prediction mode for the ALWIP, the matrix and the offset being used in the matrix vector multiplication may be differently configured. Here, the matrix may be called an (affine) weight matrix, and the offset may be called an (affine) offset vector or an (affine) bias vector. In the present document, the intra prediction mode for the ALWIP may be called an ALWIP mode, an ALWIP intra prediction mode, an LWIP mode, an LWIP intra prediction mode, an MWIP mode, an MWIP intra prediction mode, an MIP mode, or an MIP intra prediction mode. A detailed ALWIP method will be described later.

Figure 11:
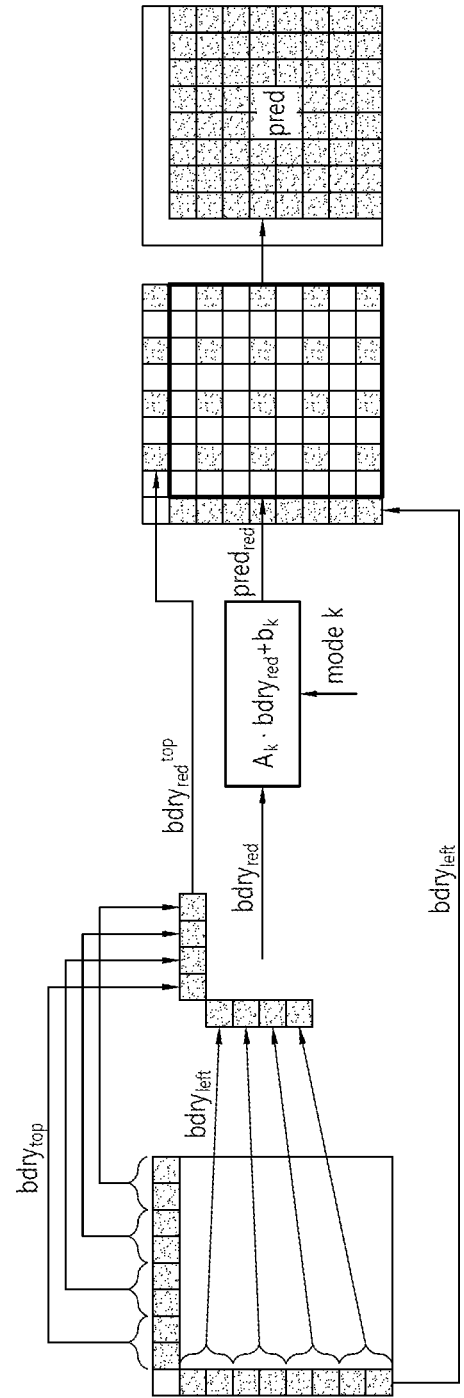
FIG. 11 is a diagram explaining MIP for an 8×8 block.

FIG. 11 is a diagram explaining MIP for an 8×8 block.

In order to predict samples of a rectangular block having a width W and a height H, the MIP may use samples neighboring the left boundary of the block and sample neighboring the top boundary. Here, the samples neighboring the left boundary may represent samples located in one line adjacent to the left boundary of the block, and may represent reconstructed samples. The samples neighboring the top boundary may represent samples located in one line adjacent to the top boundary of the block, and may represent reconstructed samples.

For example, if the reconstructed samples are not available, the reconstructed samples as in the intra prediction in the related art may be generated or derived, and may be used.

A prediction signal (or prediction samples) may be generated based on an averaging process, a matrix vector multiplication process, and a (linear) interpolation process.

For example, the averaging process may be a process for extracting samples out of the boundary through averaging. For example, if the width W and the height H of the samples are all 4, the samples being extracted may be four samples, and may be 8 samples in another case. For example, in FIG. 11, $bdry_{left}$ and $bdry_{top}$ may represent extracted left samples and top samples, respectively.

For example, the matrix vector multiplication process may be a process of performing matrix vector multiplication with the averaged samples as inputs. Further, an offset may be added. For example, in FIG. 11, $A_k$ may represent a matrix, $b_k$ may represent an offset, and $bdry_{red}$ may be a reduced signal for the samples extracted through the averaging process. Further, $bdry_{red}$ may be reduced information on $bdry_{left}$ and $bdry_{top}$. The result may be a reduced prediction signal $pred_{red}$ for a set of sub-sampled samples in the original block.

For example, the (linear) interpolation process may be a process in which a prediction signal is generated in the remaining locations from the prediction signal for the set sub-sampled by the linear interpolation. Here, the linear interpolation may represent a single linear interpolation in respective directions. For example, the linear interpolation may be performed based on the reduced prediction signal $pred_{red}$ marked in gray in the block in FIG. 11 and neighboring boundary samples, and through this, all prediction samples in the block may be derived.

For example, the matrixes ($A_k$ in FIG. 11) and offset vectors ($b_k$ in FIG. 11) required to generate the prediction signal (or prediction block or prediction samples) may be brought from three sets $S_0$, $S_1$, and $S_2$. For example, the set $S_0$ may be composed of 18 matrixes ($A_0^i$, i=0, 1, . . . , 17) and 18 offset vectors ($b_0^i$, i=0, 1, . . . , 17). Here, each of 18 matrixes may have 16 rows and 4 columns, and each of 18 offset vectors may have 16 sizes. The matrixes and the offset vectors of the set $S_0$ may be used for a block having a size of 4×4. For example, the set $S_1$ may be composed of 10 matrixes ($A_1^i$, i=0, 1, . . . , 9) and 10 offset vectors ($b_1^i$, i=0, 1, . . . , 9). Here, each of 10 matrixes may have 16 rows and 8 columns, and each of 10 offset vectors may have 16 sizes. The matrixes and the offset vectors of the set $S_1$ may be used for a block having a size of 4×8, 8×4, or 8×8. For example, the set $S_2$ may be composed of 6 matrixes ($A_2^i$, i=0, 1, . . . , 5) and 6 offset vectors ($b_2^i$, i=0, 1, . . . , 5). Here, each of 6 matrixes may have 64 rows and 8 columns, and each of 6 offset vectors may have 64 sizes. The matrixes and the offset vectors of the set $S_2$ may be used for all the remaining blocks.

Meanwhile, in an embodiment of the present document, LFNST index information may be signaled with respect to the block to which the MIP is applied. Alternatively, the encoding apparatus may generate a bitstream by encoding the LFNST index information for transforming the block to which the MIP is applied, and the decoding apparatus may obtain the LFNST index information for transforming the block to which the MIP is applied by parsing or decoding the bitstream.

For example, the LFNST index information may be information for discriminating the LFNST transform set in accordance with the number of transforms constituting the transform set. For example, an optimum LFNST kernel may be selected with respect to the block in which the intra prediction is performed to which the MIP is applied based on the LFNST index information. For example, the LFNST index information may be represented as st_idx syntax element or lfnst_idx syntax element.

For example, the LFNST index information (or st_idx syntax element) may be included in the syntax as in the following tables.

TABLE 2

| coding_unit( x0, y0, cbWidth, cbHeight, treeType) { | Descriptor |
|---|---|
|   if( tile_group_type != I    ||    sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0  &&  tile_group_type != I ) | |
|       pred_mode_flag | ae(v) |
|     if( ( ( tile_group_type == I   &&   cu_skip_flag[ x0 ][ y0 ] == 0) || | |
|       ( tile_group_type != I   &&    CuPredMode[x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ]  ==  MODE_INTRA ) { | |
|     if( sps_pcm_enabled_flag && | |
|       cbWidth >= MinIpcmCbSizeY  &&  cbWidth <= MaxIpcmCbSizeY && | |
|       cbHeight >= MinIpcmCbSizeY  &&   cbHeight <= MaxIpcmCbSizeY ) | |
|       pcm_flag[ x0 ][ y0 ] | ae(v) |
|     if( pcm_flag[ x0 ][ y0 ]) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE   ||   treeType == DUAL_TREE_LUMA ) { | |
|         if( Abs( Log2( cbWidth ) – Log2( cbHeight ) ) <= 2) | |
|           intra_mip_flag[ x0 ][ y0 ] | ae(v) |
|         if( intra_mip_flag[ x0 ][ y0 ]) { | |
|           intra_mip_mpm_flag[ x0 ][ y0 ] | ae(v) |
|           if( intra_mip_mpm_flag[ x0 ][ y0 ]) | |
|             infra_mip_mpm_idx[ x0 ][ y0] | ae(v) |
|           Else | |
|             infra_mip_mpm_remainder[ x0 ][ y0 ] | ae(v) |
|         } else { | |
|         if( ( y0 %, CtbSizeY ) > 0) | |
|           intra_luma_ref_idx[ x0 ][ y0 ] | ae(v) |
|         if (intra_luma_ref_idx[ x0 ][ y0 ] == 0 && | |
|           ( cbWidth <= MaxTbSizeY || cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] == 1 && | |
|           cbWidth <= MaxTbSizeY   &&   cbHeight <= MaxTbSizeY ) | |
|           intra_subpartitions_split_flag[ x0 ][ y0 ] | ae(v) |
|         if( intra_luma_ref_idx[ x0 ][ y0 ] == 0 && | |
|           intra_subpartitions_mode_flag[ x0 ][ y0 ] == 0 ) | |
|           intra_luma_mpm_flag[ x0 ][ y0 ] | ae(v) |
|         if( intra_luma_mpm_flag[ x0 ][ y0 ]) | |
|           intra_luma_mpm_idx[ x0 ][ y0 ] | ae(v) |
|         else | |
|           intra_luma_mpm_remainder[ x0 ][ y0 ] | ae(v) |
|         } | |
|       } | |
|       if( treeType == SINGLE_TREE   ||   treeType == DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_FNTER or MODE_IBC */ | |
|     if( cu_skip_flag[ x0 ][ y0 ] == 0) | |

TABLE 3

| | |
|---|---|
|   merge_flag[ x0 ][ y0 ] | ae(v) |
| if( merge_flag[ x0 ][ y0 ]) { | |
|   merge_data( x0, y), cbWidth, cbHeight ) | |
| } else if( CuPredMode[ x0 ][ y0 ]  ==  MODE_IBC ) { | |
|   mvd_coding( x0, y0, 0, 0) | |
|   mvp_10_flag[ x0 ][ y0 ] | ae(v) |
|   if( sps_arnvr_enabled_flag && | |
|     ( MvdL0[ x0 ][ y0 ][ 0 ]!= 0   ||   MvdL0[ x0 ][ y0 ][ 1 ]!= 0 ) ) ( | |
|     amvr_precision_flag[ x0 ][ y0 ] | ae(v) |
|   } | |
| } else { | |
|   if( tile_group_type == B ) | |
|     inter_pred_idc[ x0 ][ y0 ] | ae(v) |
|   if( sps_affine_enabled_flag   &&   cbWidth >= 16   &&   cbHeight >= 16 ) { | |
|     inter_affine_flag[ x0 ][ y0 ] | ae(v) |
|     if( sps_affine_type_flag   &&   inter_affine_flag[ x0 ][ y0 ]) | |
|       cu_affine_type_flag[ x0 ][ y0 ] | ae(v) |
|   if( inter_pred_idc[ x0 ][ y0 ] == PRED_BI   &&   !inter_affine_flag[ x0 ][ y0 ]   && | |
|     RefIdxSymL0 >-1   &&   RefIdxSymL1 >-1 ) | |

TABLE 3-continued

```
sym_mvd_flag[ x0 ][ y0 ]                                                    ae(v)
if( inter_pred_idc[ x0 ][ y0 ] != PRED_L1 ) {
    if( NumRefIdxActive[ 0 ] >1  &&  !sym_mvd_flag[ x0 ][ y0 ])
        ref_idx_l0[ x0 ][ y0 ]                                              ae(v)
    mvd_coding( x0, y0, 0, 0)
    if( MotionModelIdc[ x0 ][ y0 ] > 0 )
        mvd_coding( x0, y0, 0, 1)
    if(MotionModelIdc[ x0 ][ y0 1 > 1)
        invd_coding( x0, y0, 0, 2 )
    mvp_l0_flag[ x0 ][ yo ]                                                 ae(v)
} else {
    MvdL0[ x0 ][ y0 ][ 0 ] = 0
    MvdL0[ x0 ][ y0 ][ 1 ] = 0
}
if( inter_pred_idc[ x0 ][ y0 ]  !=  PRED_L0 ) {
    if( Num.RefIdxActive[ 1 ] > 1  &&  !sym_mvd_flag[ x0 ][ y0 ])
        ref_idx_l1[ x0 ][ y0 ]                                              ae(v)
    if( mvd_l1_zero_flag  &&  inter_pred_idc[ x0 ][ y0 ]  ==  PRED_BI ) {
        MvdL1[ x0 ][ y0 ][ 0 1 = 0
        MvdL1[ x0 )[ y0 ][ 1 ]= 0
        MvdCpL1[ x0 ][ y0 ][ 0 ][ 0 ] = 0
        MvdCpL1[ x0 ][ y0 ][ 0 ][ 1 ] = 0
        MvdCpL1[ x0 ][ y0 ][ 1 ][ 0 ] = 0
        MvdCpL1[ x0 ][ y0 ][ 1 ][ 1 ] = 0
        MvdCpL1[ x0 ][ y0 ][ 2 ][ 0 ] = 0
        MvdCpL1[ x0 ][ y0 ][ 2 ][ 1 ] = 0
    } else {
        if( sym_mvd_flag[ x0 ][ y0 ]) {
            MvdL1[ x0 ][ y0 ][ 0 ] = −MvdL0[ x0 ][ y0 ][ 0 ]
            MvdL1[ x0 ][ y0 ][ 1 ] = −MvdL0[ x0 ][ y0 ][ 1 ]
        } else
            mvd_coding( x0, y0, 1, 0 )
```

TABLE 4

```
            if( MotionModelIdc[ x0 ][ y0 ] >0 )
                mvd_coding( x0, y0, 1, 1)
            if(MotionModelIdc[ x0 ][ y0 ] > 1)
                mvd_coding( x0, y0, 1, 2)
            mvp_l1_flag[ x0 ][ y0 ]                                         ae(v)
        }
    } else {
        MvdL1[ x0 ][ y0 ][ 0 ] = 0
        MvdL1[ x0 ][ y0 ][ 1 ] = 0
    }
    if( sps_amvr_enabled_flag  &&  inter_affine_flag  ==  0 &&
        ( MvdL0[ x0 ][ y0 ][ 0 ]  != 0  ||  MvdL0[ x0 ][ y0 ][ 1 ] !=0 ||
          MvdL1[ x0 ][ y0 ][ 0 ]  != 0  ||  MvdL1[ x0 ][ y0 ][ 1] != 0 ) ) ||
        ( sps_affine_amvr_enabled_flag && inter_affine_flag[ x0 ][ y0 ]  ==  1 &&
          ( MvdCpL0[ x0 ][ y0 ][ 0 ][ 0 ]  !=  || MvdL0[ x0 ][ y0 ][ 0 ][ 1 ] !=0 ;  ||
            MvdCpL1[ x0 ][ y0 ][ 0 ][ 0 ]    !=0  ||  MvdCpL1[ x0 ][ y0 ][ 0 ][ 1 ] !=0  ||
            MvdCpL0[ x0 ][ y0 ][ 1 ][ 0 ]    !=0  ||  MvdCpL0[ x0 ][ y0 ][ 1 ][ 1 ] !=0  ||
            MvdCpL1[ x0 ][ y0 ][ 1 ][ 0 ]    !=0  ||  MvdCpL1[ x0 ][ y0 ][ 1 ][ 1 ] !=0  ||
            MvdCpL0[ x0 ][ y0 ][ 2 ][ 0 ]    !=0  ||  MvdCpL0[ x0 ][ y0 ][ 2 ][ 1 ] !=0  ||
            MvdCpL1[ x0 ][ y0 ][ 2 ][ 0 ]    !=0  ||  MvdCpL1[ x0 ][ y0 ][ 2 ][ 1 ]  !=  0 ) )
{
            amvr_flag[ x0 ][ y0 ]                                           ae(v)
            if( amvr_flag[ x0 ][ y0 ])
                amvr_precision_flag[ x0 ][ y0 ]                             ae(v)
            if( sps_gbi_enabled_flag  &&  inter_pred_idc[ x0 ][ y0 ]  ==  PRED_BI  &&
                luma_weight_l0_flag[ ref_idx_l0 [ x0 ][ y0 ] ]  ==  0  &&
                luma_weight_l1_flag[ ref idx_l1 [ x0 ][ y0 ] ]  ==  0  &&
                chroma_weight_l0_flag[ ref_idx_l0 [ x0 ][ y0 ] ]  ==  0  &&
                chroma_weight_l1_flag[ ref_idx_l1 [ x0 ][ y0 ] ]  ==  0  &&
                cbWidth * cbHeight   >=   256 )
                gbi_idx[ x0 ][ y0 ]                                         ae(v)
        }
    }
if( !pcm_flag[ x0 ][ y0 ]) {
    if( CuPredMode[ x0 ][ y0 ]  !=  MODE_INTRA  &&  merge_flag[ x0 ][ y0 ]  ==  0)
        cu_cbf                                                              ae(v)
    if( cu_cbf ) {
        if( CuPredMode[ x0 ][ y0 ]  ==  MODE_INTER  &&  sps_sbt_enabled_flag  &&
            !ciip_flag[ x0 ][ y0 ]) {
```

TABLE 4-continued

```
if( cbWidth <= MaxSbtSize   &&   cbHeight <= MaxSbtSize ){
   allowSbtVerH   =   cbWidth >= 8
   allowSbtVerQ   =   cbWidth >= 16
   allowSbtHorH   =   cbHeight >= 8
   allowSbtHorQ   =   cbHeight >= 16
   if( allowSbtVerH   ||   allowSbtHorH   ||   allowSbtVerQ   ||   allowSbtHorQ )
      cu_sbt_flag                                                                    ae(v)
}
if( cu_sbt_flag ) {
   if( ( allowSbtVerH   ||   allowSbtHorH )   &&   ( allowSbtVerQ   ||   allowSbtHorQ) )
      cu_sbt_quad_flag                                                               ae(v)
   if(  ( cu_sbt_quad_flag   &&   allowSbtVerQ && allowSbtHorQ ) ||
        ( !cu_sbt_quad_flag   &&   allowSbtVerH && allowSbtHorH ) )
      cu_sbt_horizontal_flag                                                         ae(v)
      cu_sbt_pos_flag                                                                ae(v)
   }
}
numSigCoeff = 0
```

TABLE 5

```
numZeroOutSigCoeff = 0
transfom_tree( x0, y0, cbWidth, cbHeight, treeType )
if( Min( cbWidth, cbHeight ) >= 4 && sps_st_enabled_flag ==
    1 && CuPredMode[ x0 ][ y0 ]   ==   MODE_INTRA
    && IntraSubPartitionsSplitType == ISP_NO_SPLIT ) {
    if( ( numSigCoeff > ( ( treeType == SINGLE_TREE ) ? 2 :
        1 ) ) && numZeroOutSigCoeff == 0) {
        st_idx[ x0 ][ y0 ]                                    ae(v)
    }
  }
 }
}
```

Table 2 to Table 5 as above may successively represent one syntax or information.

For example, in Table 2 to Table 5, information or semantics represented by an intra_mip_flag syntax element, an intra_mip_mpm_flag syntax element, an intra_mip_mpm_idx syntax element, an intra_mip_mpm_remainder syntax element, or a st_idx syntax element may be as in the following table.

TABLE 6 intra_mipflag[ x0 ][ y0 ] equal to 1 specifies that the intra prediction type for luma samples is matrix based intra prediction. intra_nnip_flag[ x0 ][ y0 ] equal to 0 specifies that the intra prediction type for luma samples is not matrix based intra prediction.
When intra_mip_flag[ x0 ][ y0 ]is not present, it is inferred to be equal to 0.
The syntax elements intra_mip_mpm_flag[ x0 ][ y0], intra_mip_mpm_idx[ x0 ][ y0 ]and intra_mip_mpm_remainder[ x0 ][ y0 ]specify the matrix based intra prediction mode for luma samples. The array indices x0, y0 specify the location ( x0 , y0 ) of the top-left luma sample of the considered coding block relative to the top-left luma sample of the picture.
When intra_mip_mpm_flag[ x0 ] y0 ]is equal to 1, the matrix based intra prediction mode is
inferred from a neighbouring intra-predicted coding unit.
When intra_mip_mpm_flag[ x0 ][ y0 ]is not present, it is inferred to be equal to 1.
st_idx[x0][y0] specifies which transform kernels (LFNST kernels) are applied to the LFNST for the current block. st_idx may indicate one of transform kernels in the LFNST transform set which may be detemrnied based on intra/inter prediction and/or block size of the current block.

For example, the intra_mip_flag syntax element may represent information on whether MIP is applied to luma samples or the current block. Further, for example, the intra_mip_mpm_flag syntax element, the intra_mip_mpm_idx syntax element, or the intra_mip_mpm_remainder syntax element may represent information on the intra prediction mode to be applied to the current block in case that the MIP is applied. Further, for example, the st_idx syntax element may represent information on the transform kernel (LFNST kernel) to be applied to the LFNST for the current block. That is, the st_idx syntax element may be information representing one of transform kernels in the LFNST transform set. Here, the st_idx syntax element may be represented as the lfnst_idx syntax element or the LFNST index information.

Figure 12:
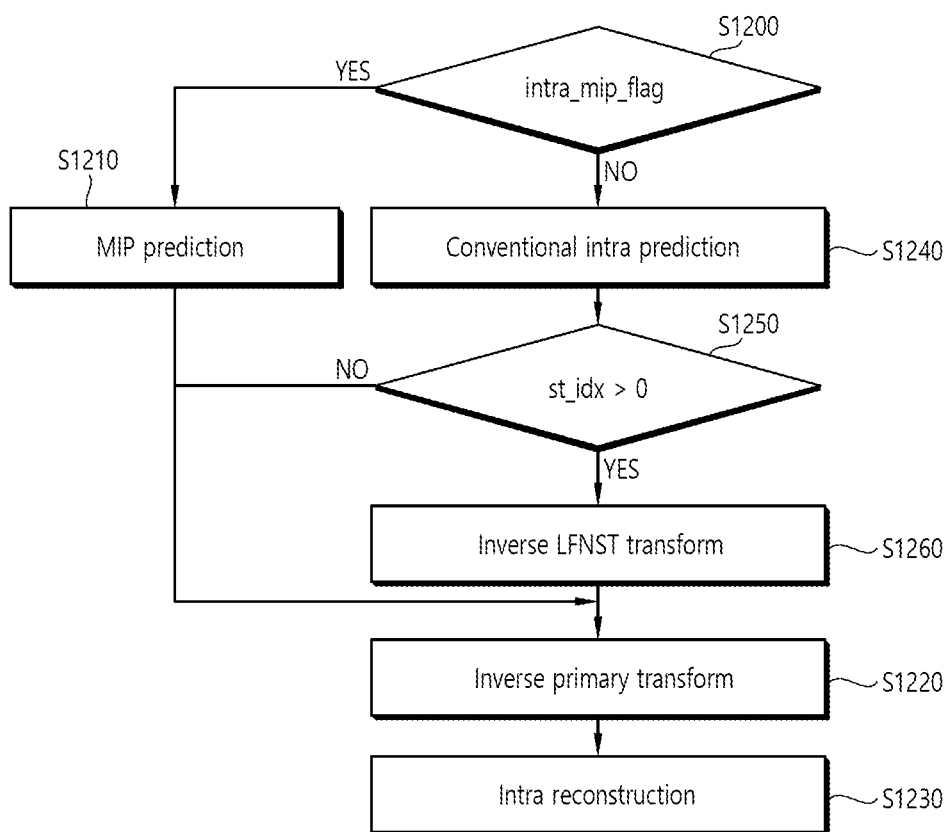
FIG. 12 is a flowchart explaining a method to which MIP and LFNST are applied.

FIG. 12 is a flowchart explaining a method to which MIP and LFNST are applied.

Meanwhile, another embodiment of the present document may not signal LFNST index information with respect to a block to which MIP is applied. Further, the encoding apparatus may generate a bitstream by encoding image information excluding the LFNST index information for transform of the block to which the MIP is applied, and the decoding apparatus may parse or decode the bitstream, and may perform a process of transforming the block without the LFNST index information for transforming the block to which the MIP is applied.

For example, if the LFNST index information is not signaled, the LFNST index information may be induced as a default value. For example, the LFNST index information induced as the default value may be a value of 0. For example, the LFNST index information having the value of 0 may represent that the LFNST is not applied to the corresponding block. In this case, since the LFNST index information is not transmitted, a bit amount for coding the LFNST index information can be reduced. Further, complexity can be reduced by preventing the MIP and the LFNST from being simultaneously applied, and thus latency can also be reduced.

Referring to FIG. 12, it may be first determined whether the MIP is applied to the corresponding block. That is, it may be determined whether the intra_mip_flag syntax element value is 1 or 0 (S1200). For example, if the intra_mip_flag syntax element value is 1, it may be considered as true or yes, and it may represent that the MIP is applied to the corresponding block. Accordingly, the MIP prediction may be performed for the corresponding block (S1210). That is, the prediction block for the corresponding block may be derived by performing the MIP prediction. Thereafter, an inverse primary transform procedure may be performed (S1220), and an intra reconstruction procedure may be performed (S1230). In other words, a residual block may be derived by performing the inverse primary transform with respect to transform coefficients obtained from a bitstream, and a reconstructed block may be generated based on the prediction block according to the MIP prediction and the residual block. That is, the LFNST index information for the block to which the MIP is applied may not be included. Further, the LFNST may not be applied to the block to which the MIP is applied.

Further, for example, if the intra_mip_flag syntax element value is 0, it may be considered as false or no, and it may represent that the MIP is not applied to the corresponding block. That is, a conventional intra prediction may be applied to the corresponding block (S1240). That is, the prediction block for the corresponding block may be derived by performing the conventional intra prediction. Thereafter, it may be determined whether the LFNST is applied to the corresponding block based on the LFNST index information. In other words, it may be determined whether the value of the st_idex syntax element is larger than 0 (S1250). For example, if the value of the st_idex syntax element is larger than 0, the inverse LFNST transform procedure may be performed using the transform kernel represented by the st_idex syntax element (S1260). Further, if the value of the st_idex syntax element is not larger than 0, it may represent that the LFNST is not applied to the corresponding block, and the inverse LFNST transform procedure may not be performed. Thereafter, the inverse primary transform procedure may be performed (S1220), and the intra reconstruction procedure may be performed (S1230). In other words, the residual block may be derived by performing the inverse primary transform with respect to the transform coefficients obtained from the bitstream, and the reconstructed block may be generated based on the prediction block according to the conventional intra prediction and the residual block.

In summary, if the MIP is applied, the MIP prediction block may be generated without decoding the LFNST index information, and the final intra reconstruction signal may be generated by applying the inverse primary transform to the received coefficient.

In contrast, if the MIP is not applied, the LFNST index information may be decoded, and if the value of the flag (or LFNST index information or st_idx syntax element) value is larger than 0, the final intra reconstruction signal may be generated by applying the inverse LFNST transform and the inverse primary transform with respect to the received coefficient.

For example, for the above-described procedure, the LFNST index information (or st_idx syntax element) may be included in the syntax or image information based on the information (or intra_mip_flag syntax element) on whether the MIP is applied, and may be signaled. Further, the LFNST index information (or st_idx syntax element) may be selectively configured/parsed/signaled/transmitted/received with reference to the information (or intra_mip_flag syntax element) on whether the MIP is applied. For example, the LFNST index information may be represented as the st_idx syntax element or lfnst_idex syntax element.

For example, the LFNST index information (or st_idx syntax element) may be included as in Table 7 below.

TABLE 7

```
...
if( !pcm_flag[ x0 ][ y0 1) {
    if( CuPredMode[ x0 ][ y0 ]  !=  MODE_INTRA  &&  merge_flag[ x0 ][ y0 ]  = =  0)
        cu_cbf                                                                          ae(v)
    if( cu_cbf ) {
        if( CuPredMode[ x0 ][ y0]  = =  MODE_INTER  &&  sps_sbt_enabled_flag  &&
            !ciip_flag[ x0 ][ y0 ]) }
            if( cbWidth <= MaxSbtSize  &&  cbHeight <= MaxSbtSize ) {
                allowSbtVerH  =  cbWidth >= 8
                allowSbtVerQ  =  cbWidth >= 16
                allowSbtHorH  =  cbHeight >= 8
                allowSbtHorQ  =  cbHeight >= 16
                if( allowSbtVerH  ||  allowSbtHorH  ||      allowSbtVerQ  ||  allowSbtliorQ )
                    cu_sbt_flag                                                         ae(v)
            }
            if( cu_sbt_flag ) {
                if( ( allowSbtVerH  ||  allowSbtHorH )  &&  ( allowSbtVerQ  ||  allowSbtHorQ) )
                    cu_sbt_quad_flag                                                    ae(v)
                if(  ( cu_sbt_quad_flag  &&  allowSbtVerQ && allowSbtHorQ )
                    ( !cu_sbt_quad_flag  &&  allowSbtVerH && allowSbtHorH ) )
                    cu_sbt_horizontal_flag                                              ae(v)
                    cu_sbt_pos_flag                                                     ae(v)
            }
        }
        numSigCoeff = 0
        numZeroOutSigCoeff = 0
        transform_tree( x0, y0, cblVidthc cbHeight, treeType )
        if( Min( cbWidth, cbWeight ) >= 4 && sps_st_enabled_flag ==1 &&
            CuPredMode[ x0 ][ y0 ]  = =  MODE_INTRA
            && IntraSubPartitionsSplitType == ISP_NO_SPLIT
            && !intra_mip_flag [ x0 ][ y0 ]) {
            if( ( numSigCoeff > ( ( treeType == SINGLE_TREE ) ? 2 : 1 ) ) &&
                numZeroOutSigCoeff == 0) {
```

TABLE 7-continued

```
      st_idx[ x0 ][ y0 1                                              ae(r)
     }
    }
   }
  }
...
```

For example, referring to Table 7, the st_idx syntax element may be included based on the intra_mip_flag syntax element. In other words, if the value of the intra_mip_flag syntax element is 0(!intra_mip_flag), the st_idx syntax element may be included.

Further, for example, the LFNST index information (or lfnst_idx syntax element) may be included as in Table 8 below.

TABLE 8

```
if( Min( IfnstWirith, IfnstHeight ) >= 4 && sps_lfnst_enabled_flag = = 1 &&
    CuPredMode[ chType ][ x0 ][ y0 ] = = MODE_INTRA && IfnstNotTsFlag = = 1 &&
    ( treeType = = DUAL_TREE_CHROMA || !intra_mip_flag[ x0 ][ y0] ||
      Min( lfhstWidth. lfastHeight ) >= 16 ) &&
    Max( cbWidth, cbHeight ) <= MaxTbSizeY) {
  if( ( IntraSubPartitionsSplitType != ISP_NO_SPLIT || LfnstDcOnly = = 0) &&
      LfnstZeroOutSigCoeffFlag = = 1 )
    lfnst_idx                                                         ae(v)
}
if( treeType != DUAL_TREE_CHROMA && lfnst idx = = 0 &&
    transform_skip_flag[ x0 ][ y0 ][ 0 ] = = 0 && Max( cbWidth, cbHeight ) <= 32 &&
    IntraSubPartitionsSplitType = = ISP_NO_SPLIT && cu_sbt_flag = = 0 &&
    MtsZeroOutSigCoeffFlag == 1 && MtsDcOnly = = 0 ) {
  if( ( ( CuPredMode[ chType ][ x0 ][ y0] = = MODE_INTER &&
      sps_explicit_mts_inter_enabled_flag ) ||
      ( CuPredMode[ chType ][ x0 ][ y0] = = MODE_INTRA &&
      sps_explicit_mts_intra_enabled_flag ) ) )
    mts_idx                                                           ae(v)
}
```

For example, referring to Table 8, the lfnst_idx syntax element may be included based on the intra_mip_flag syntax element. In other words, if the value of the intra_mip_flag syntax element is 0(!intra_mip_flag), the lfnst_idx syntax element may be included.

For example, referring to Table 7 or Table 8, the st_idx syntax element or the lfnst_idx syntax element may be included based on intra sub-partitions (ISP) related information about sub-partitioning of the block. For example, the ISP related information may include the ISP flag or the ISP partitioning flag, and through this, information on whether sub-partitioning is performed with respect to the block may be represented. For example, the information on whether the sub-partitioning is performed may be represented as IntraSubPartitionsSplitType, ISP_NO_SPLIT may represent that the sub-partitioning is not performed, ISP_HOR_SPLIT may represent that the sub-partitioning is performed in a horizontal direction, and ISP_VER_SPLIT may represent that the sub-partitioning is performed in a vertical direction.

The residual related information may include the LFNST index information based on the MIP flag and the ISP related information.

Meanwhile, in another embodiment of the present document, the LFNST index information may be induced with respect to the block to which the MIP is applied without being separately signaled. Further, the encoding apparatus may generate the bitstream by encoding image information excluding the LFNST index information to transform the block to which the MIP is applied, and the decoding apparatus may parse or decode the bitstream, induce and obtain the LFNST index information to transform the block to which the MIP is applied, and perform a process of transforming the block based on this.

That is, the LFNST index information may not be decoded with respect to the corresponding block, but through an inducing process, the index for partitioning the transforms constituting the LFNST transform set may be determined. Further, through the inducing process, it may be determined that a separate optimized transform kernel is used for the block to which the MIP is applied. In this case, the optimum LFNST kernel may be selected with respect to the block to which the MIP is applied, and the bit amount for coding this may be reduced.

For example, the LFNST index information may be induced based on at least one of reference line index information for intra prediction, intra prediction mode information, block size information, or MIP application/non-application information.

Meanwhile, in another embodiment of the present document, the LFNST index information for the block to which the MIP is applied may be binarized to be signaled. For example, the number of applicable LFNST transforms may differ depending on whether the MIP is applied to the current block, and for this, the binarization method for the LFNST index information may be selectively switched.

For example, one LFNST kernel may be used with respect to the block to which the MIP is applied, and this kernel may be one of LFNST kernels being applied to the block to which the MIP is not applied. Further, the existing LFNST kernel having been used may not be used for the block to which the MIP is applied, but a separate kernel optimized to the block to which the MIP is applied may be defined and used.

In this case, since a reduced number of LFNST kernels is used with respect to the block to which the MIP is applied as compared with that of the block to which the MIP is not applied, overhead due to the signaling of the LFNST index information may be reduced, and the complexity may be reduced.

For example, the LFNST index information may use the binarization method as in the following table.

TABLE 9

| Syntax structure | Syntax element | Binarization | |
|---|---|---|---|
| | | Process | Input parameters |
| | . . . | . . . | . . . |
| | st_idx[ ][ ] intra_mip_flag[ ][ ] == false | TR | cMax = 2, cRiceParam = 0 |
| | st_idx[ ][ ] intra_mip_flag[ ][ ] == true | FL | cMax = 1 |

Referring to Table 9, for example, the st_idx syntax element may be binarized to truncated rice (TR) in case that the MIP is not applied to the corresponding block, in case of intra_mip_flag[ ][ ]==false, or in case that the value of the intra_mip_flag syntax element is 0. In this case, for example, cMax that is an input parameter may have a value of 2, and cRiceParam may have a value of 0.

Further, for example, the st_idx syntax element may be binarized to a fixed-length (FL) in case that the MIP is applied to the corresponding block, in case of intra_mip_flag[ ][ ]==true, or in case that the value of the intra_mip_flag syntax element is 1. In this case, for example, the cMax that is an input parameter may have a value of 1.

Here, the st_idx syntax element may represent the LFNST index information, and may be represented as the lfnst_idx syntax element.

Meanwhile, in another embodiment of the present document, the LFNST related information may be signaled with respect to the block to which the MIP is applied.

For example, the LFNST index information may include one syntax element, and may represent information on whether the LFNST is applied based on one syntax element and information on the kind of the transform kernel being used for the LFNST. In this case, the LFNST index information may be represented as, for example, the st_idx syntax element or the lfnst_idx syntax element.

Further, for example, the LFNST index information may include one or more syntax elements, and may represent information on whether the LFNST is applied based on the one or more syntax elements and information on the kind of the transform kernel being used for the LFNST. For example, the LFNST index information may include two syntax elements. In this case, the LFNST index information may include a syntax element representing information on whether the LFNST is applied and a syntax element representing information on the kind of the transform kernel being used for the LFNST. For example, the information on whether the LFNST is applied may be represented as an LFNST flag, and may be represented as an st_flag syntax element or an lfnst_flag syntax element. Further, for example, the information on the kind of the transform kernel being used for the LFNST may be represented as the transform kernel index flag, and may be represented as an st_idx_flag syntax element, st_kernel_flag syntax element, lfnst_idx_flag syntax element, or lfnst_kernel_flag syntax element. For example, in case that the LFNST index information include one or more syntax elements as described above, the LFNST index information may be called LFNST related information.

For example, the LFNST related information (e.g., st_flag syntax element or st_idx_flag syntax element) may be included as in Table 10 below.

TABLE 10

```
...
    if( !pcm_flag[ x0 ][ y0 ] ) {
        if( CuPredMode[ x0 ][ y0 ]  !=  MODE_INTRA  &&  merge_flag[ x0 ][ y0 ]  = =  0)
            cu_cbf                                                                        ae(v)
        if( cu_cbf ) {
            if( CuPredMode[ x0 ][ y0 ]  = =  MODE_INTER  &&  sps_sbt_enabled_flag  &&
               !ciip_flag[ x0 ][ y0 ]) {
                if( cbWidth <= MaxSbtSize  &&  cbHeight <= MaxSbtSize ) {
                    allowSbtVerH  =  cbWidth  >= 8
                    allowSbtVerQ  =  cbWidth  >= 16
                    allowSbtHotH  =  cbHeight  >= 8
                    allowSbtHorQ  =  cbHeight  >= 16
                    if( allowSbtVerH  ||  allowSbtHorH        allowSbtVerQ  ||  allowSbtHorQ )
                        cu_sbt_flag                                                       ae(v)
                }
                if( cu_sbt_flag ) {
                    if( ( allowSbtVerH  ||  allowSbtHorH )  &&  ( allowSbtVerQ  ||  allowSbtHorQ) )
                        cu_sbt_quad_flag                                                  ae(v)
                    if(   ( cu_sbt_quad_flag  &&  allowSbtVerQ && allowSktHorQ ) ||
                        ( !cu_sbt_quad_flag  &&  allowSbtVerH && allowSbtHorH ) )
                        cu_sbt horizontal flag                                            ae(v)
                    cu_sbt_pos_flag                                                       ae(v)
                }
            }
            numSigCoeff = 0
            numZeroOutSigCoeff = 0
            transform_tree( x0, y0, cbWidth, cbHeight, treeType )
            if( Min( cbWidth, &Height ) >= 4 && sps_st_enabled_flag == 1 &&
                CuPredMode[ x0 ][ y0 ]  = =  MODE_INTRA
                && IntraSubPartitionsSplitType == ISP_NO_SPLIT ) {
                if( ( numSigCoeff > ( ( treeType == SINGLE_TREE ) ? 2 : 1 ) ) &&
                    numZeroOutSigCoeff == 0) {
                    st_flag[ x0 ][ y0 ]                                                   ae(v)
                    if ( st_flag[x0 ][ y0 ])
```

TABLE 10-continued

```
            st_idx_flag[ x0 ][ y0 ]                                          ae(v)
          }
        }
      }
    }
...
```

Meanwhile, the block to which the MIP is applied may use a different number of LFNST transforms (kernels) from that of the block to which the MIP is not applied. For example, the block to which the MIP is applied may use only one LFNST transform kernel. For example, the one LFNST transform kernel may be one of LFNST kernels being applied to the block to which the MIP is not applied. Further, instead of using the existing LFNST kernel having been used with respect to the block to which the MIP is applied, a separate kernel optimized to the block to which the MIP is applied may be defined and used.

In this case, the information (e.g., transform kernel index flag) on the kind of the transform kernel being used for the LFNST among the LFNST related information may be selectively signaled depending on whether the MIP is applied, and the LFNST related information at this time may be included, for example, as in Table 11 below.

block. Further, for example, the st_idx_flag syntax element may be signaled to !intra_mip_flag in case that the MIP is not applied to the corresponding block.

For example, in Table 10 or Table 11, information or semantics represented by the st_flag syntax element or the st_idx_flag syntax element may be as in the following table.

TABLE 12 st_flag[ x0 ][ y0 ] specifies whether secondary transform is applied or not. st_flag[ x0 ][ y0 ] equal to 0 specifies that the secondary transform is not applied. The array indices x0, y0 specify the location ( x0, y0 ) of the top-left sample of the considered transform block relative to the top-left sample of the picture.
When st_flag[ x0 ][ y0 ] is not present, st_idx[ x0 ][ y0 ] is inferred to be equal to 0.

TABLE 11

```
...
if( !pcm_flag[ x0 ][ y0 ]) {
  if( CuPredMode[ x0 ][ y0 ] != MODE_INTRA && merge_flag[ x0 ][ y0 ] = = 0)
      cu_cbf                                                                  ae(v)
  if( cu_cbf ) {
    if( CuPredMode[ x0 ][ y0 ] = = MODE_INTER && sps_sbt_enabled_flag &&
        !ciip_flag[ x0 ][ y0 ]) {
      if( cbWidth <= MaxSbtSize && cbHeight <= MaxSbtSize ) {
        allowSbtVerH  =  cbWidth  >= 8
        allowSbtVerQ  =  cbWidth  >= 16
        allowSbtHorH  =  cbHeight >= 8
        allowSbtHorQ  =  cbHeight >= 16
        if( allowSbtVerH || allowSbtflorH ||    allowSbtVerQ    allowSbtHorQ)
            cu_sbt_flag                                                       ae(v)
      }
      if( cu_sbt_flag ) {
        if( ( allowSbtVerH || allowSbtHorH ) && ( allowSbtVerQ || allowSbtHorQ) )
            cu_sbt_quad_flag                                                  ae(v)
        if( ( cu_sbt_quad_flag && allowSbtVerQ && allowSbtHorQ ) ||
            ( !cu_sbt_quad_flag && allowSbtVerH && allowSbtHorH ) )
            cu_sbt_horizontal_flag                                            ae(v)
            cu_sbt_pos_flag                                                   ae(v)
      }
    }
    numSigCoeff = 0
    numZeroOutSigCoeff = 0
    transform_tree( x0, y0, cbWidth, cbHeight, treeType )
    if( Min( cbWidth, cdHeight ) >= 4 && sps_st_enabled_flag == 1 &&
        CuPredMode[ x0 ][ y0 ] = = MODE_INTRA
        && IntraSubPartitionsSplitType == ISP_NO_SPLIT ) {
      if( ( numSigCoeff > ( ( treeType == SINGLE_TREE ) ? 2 : 1 ) ) &&
          numZeroOutSigCoeff == 0 ) {
        st_flag[ x0 ][ y0 ]                                                   ae(v)
        if( st_flag[ x0 ][ y0 ]&& !intra_mip_flag[ x0 ][ y0 ])
            st_idx_flag[ x0 ][ y0 ]                                           ae(v)
      }
    }
  }
}
...
```

In other words, referring to Table 11, the information (or st_idx_flag syntax element) on the kind of the transform kernel being used for the LFNST may be included based on the information (or intra_mip_flag syntax element) on whether the MIP has been applied to the corresponding TABLE 12-continued st_idx_flag[ x0 ][ y0 ]specifies which secondary transform kernel is applied between two candidate kernels in a selected TABLE 12-continued transform set. The array indices x0, y0 specify the location (x0, y0) of the top-left sample of the considered transform block relative to the top-left sample of the picture.
When st_idx_flag[ x0 ][ y0 ] is not present, st_idx[ x0 ][ y0 ] is inferred to be equal to 0.

For example, the st_flag syntax element may represent information on whether secondary transform is applied. For example, if the value of the st_flag syntax element is 0, it may represent that the secondary transform is not applied, whereas if 1, it may represent that the secondary transform is applied. For example, the st_idx_flag syntax element may represent information on the applied secondary transform kernel of two candidate kernels in the selected transform set.

For example, for the LFNST related information, a binarization method as in the following table may be used.

TABLE 13

| Syntax structure | Syntax element | Binarization | |
|---|---|---|---|
| | | Process | Input parameters |
| ... | ... | ... | ... |
| | st_flag[ ][ ] | FL | cMax = 1 |
| | st_idx_flag[ ][ ] | FL | cMax = 1 |

Referring to Table 13, for example, the st_flag syntax element may be binarized to FL. For example, in this case, cMax that is the input parameter may have a value of 1. Further, for example, the st_idx_flag syntax element may be binarized to the FL. For example, in this case, the cMax that is the input parameter may have a value of 1.

For example, referring to Table 10 or Table 11, a descriptor of the st_flag syntax element or the st_idx_flag syntax element may be ae(v). Here, ae(v) may represent context-adaptive arithmetic entropy-coding. Further, the syntax element of which the descriptor is ae(v) may be context-adaptive arithmetic entropy-coded syntax element. That is, the context-adaptive arithmetic entropy-coding may be applied to the LFNST related information (e.g., st_flag syntax element or st_idx_flag syntax element). Further, the LFNST related information (e.g., st_flag syntax element or st_idx_flag syntax element) may be information or a syntax element to which the context-adaptive arithmetic entropy-coding is applied. Further, the LFNST related information (e.g., bins of a bin string of the st_flag syntax element or the st_idx_flag syntax element) may be encoded/decoded based on the above-described CABAC and the like. Here, the context-adaptive arithmetic entropy-coding may be represented as context model based coding, context coding, or regular coding.

For example, context index increment (ctxInc) of the LFNST related information (e.g., st_flag syntax element or st_idx_flag syntax element) or ctxInc in accordance with the bin location of the st_flag syntax element or the st_idx_flag syntax element may be allocated or determined as in Table 14. Further, as in Table 14, a context model may be selected based on the ctxInc in accordance with the bin location of the st_flag syntax element or the st_idx_flag syntax element that is allocated or determined as in Table 14.

TABLE 14

| Syntax element | binIdx | | | | | |
|---|---|---|---|---|---|---|
| | 0 | 1 | 2 | 3 | 4 | >=5 |
| ... | ... | ... | ... | ... | ... | ... |
| st_flag[ ][ ] | 0.1 (clause 9.5.4.2.8) | na | na | na | na | na |
| st_idx_flag[ ][ ] | bypass | na | na | na | na | na |

Referring to Table 14, for example, (the bin of the bin string or the first bin of) the st_flag syntax element may use two context models (or ctxIdx), and a context model may be selected based on the ctxInc having a value of 0 or 1. Further, for example, bypass coding may be applied to (the bin of the bin string or the first bin of) the st_idx_flag syntax element. Further, the coding may be performed by applying a regular probability distribution.

For example, the ctxInc of (the bin of the bin string or the first bin of) the st_flag syntax element may be determined based on Table 15 below.

TABLE 15

9.5.4.2.8 Derivation process of ctxInc for the syntax element st_flag
Inputs to this process are the colour component index cIdx, the luma or chroma location ( x0, y0 ) specifying the top-left sample of the current luma or chroma coding block relative to the top-left sample of the current picture depending on cIdx. the tree type treeType and the multiple transform selection index m_mts_idx[ x0 ][ y0 ].
Output of this process is ctxInc.
The assignment of ctxInc is specified as follows:
  ctxInc = ( ru_mts_idx[ x0 ][ y0 ] == 0 && treeType != SINGLE_TREE ) ? 1 : 0

Referring to Table 15, for example, the ctxInc of (the bin of the bin string or the first bin of) the st_flag syntax element may be determined based on an MTS index (or tu_mts_idx syntax element) or tree type information (treeType). For example, the ctxInc may be derived as 1 in case that the value of the MTS index is 0 and the tree type is not a single tree. Further, the ctxInc may be derived as 0 in case that the value of the MTS index is not 0 or the tree type is the single tree.

In this case, since a reduced number of LFNST kernels is used with respect to the block to which the MIP is applied as compared with that of to which the MIP is not applied, overhead due to the signaling of the LFNST index information may be reduced, and the complexity may be reduced.

Meanwhile, in another embodiment of the present document, the LFNST kernel may be induced and used with respect to the block to which the MIP is applied. That is, the LFNST kernel may be induced without separately signaling information on the LFNST kernel. Further, the encoding apparatus may generate the bitstream by encoding image information excluding the LFNST index information to transform the block to which the MIP is applied and information on (the kind of) the transform kernel being sued for the LFNST, and the decoding apparatus may parse or decode the bitstream, induce and obtain the LFNST index information to transform the block to which the MIP is applied and the information on the transform kernel being used for the LFNST, and perform a process of transforming the block based on this.

That is, the LFNST index information for the corresponding block or information on the transform kernel used for the LFNST may not be decoded, but through an inducing process, the index for partitioning the transforms constituting the LFNST transform set may be determined. Further, through the inducing process, it may be determined that a separate optimized transform kernel is used for the block to which the MIP is applied. In this case, the optimum LFNST kernel may be selected with respect to the block to which the MIP is applied, and the bit amount for coding this may be reduced.

For example, the LFNST index information or the information on the transform kernel being used for the LFNST may be induced based on at least one of reference line index information for intra prediction, intra prediction mode information, block size information, or MIP application/non-application information.

In the above-described embodiments of the present document, fixed-length (FL) binarization may represent a binarization method with a fixed length such as a specific number of bits, and the specific number of bits may be predefined, or may be represented based on the cMax. Truncated unary (TU) binarization may represent a binarization method with a variable length without appending 0 in case that the number of symbols, being intended to express using 1 of which the number is as many as the number of symbols and one 0, is equal to the maximum length, and the maximum length may be represented based on the cMax. Truncated rice (TR) binarization may represent a binarization method in the form in which prefix and suffix are connected to each other, such as TU+FL, using the maximum length and shift information, and in case that the shift information has a value of 0, it may be equal to the TU. Here, the maximum length may be represented based on the cMax, and the shift information may be represented based on cRiceParam.

Figure 13:
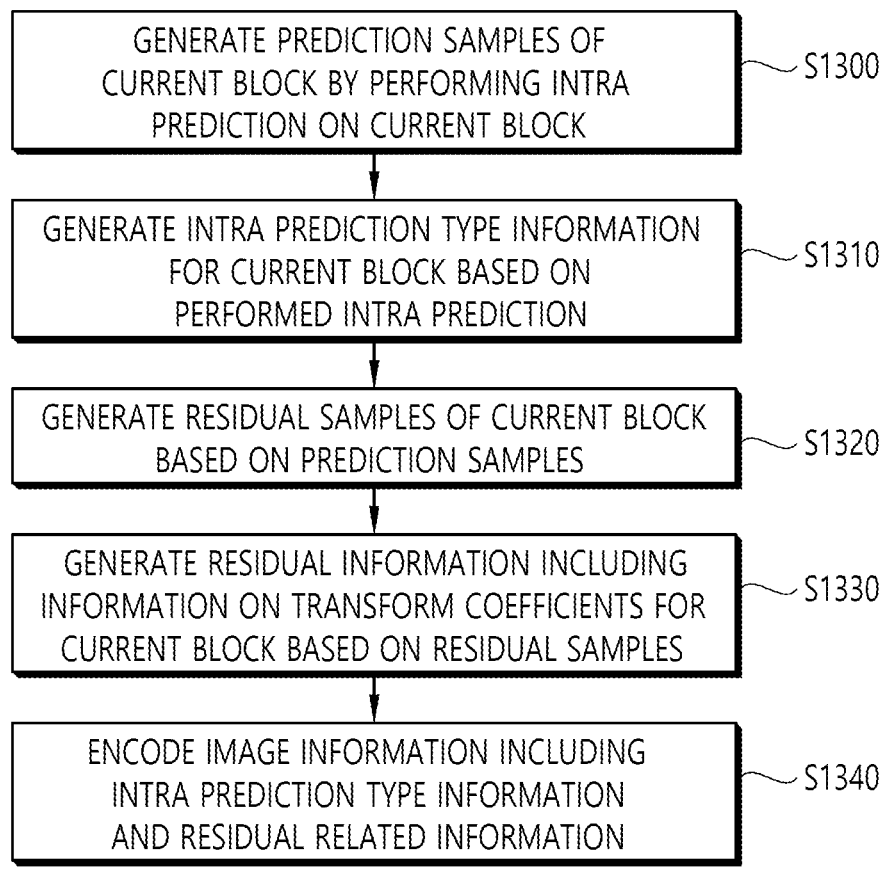
FIGS. 13 and 14 schematically illustrate a video/image encoding method and an example of related components according to embodiment(s) of the present document.
Figure 14:
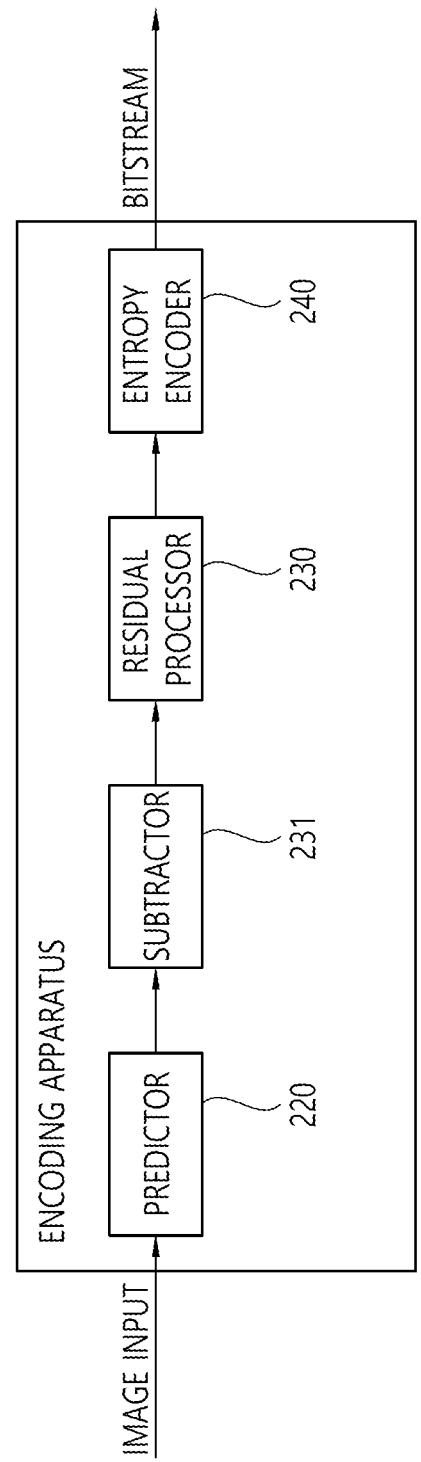

FIGS. 13 and 14 schematically illustrate a video/image encoding method and an example of related components according to embodiment(s) of the present document.

The method disclosed in FIG. 13 may be performed by an encoding apparatus disclosed in FIG. 2 or FIG. 14. Specifically, for example, S1300 to S1320 of FIG. 13 may be performed by the predictor 220 of the encoding apparatus of FIG. 14, and S1330 to S1350 of FIG. 13 may be performed by the residual processor 230 of the encoding apparatus of FIG. 14, and S1360 of FIG. 13 may be performed by the entropy encoder 240 of the encoding apparatus of FIG. 14. Further, although not illustrated in FIG. 13, the predictor 220 of the encoding apparatus in FIG. 14 may derive prediction samples or prediction related information, the residual processor 230 of the encoding apparatus may derive residual information from the original samples or prediction samples, and the entropy encoder 240 of the encoding apparatus may generate a bitstream from the residual information or the prediction related information. The method disclosed in FIG. 13 may include the above-described embodiments of the present document.

Referring to FIG. 13, the encoding apparatus may generate prediction samples of the current block by performing intra prediction on the current block (S1300), and may generate intra prediction type information for the current block based on the performed intra prediction (S1310). For example, the encoding apparatus may determine an intra prediction mode and/or an intra prediction type for the current block in consideration of rate distortion (RD) cost. The intra prediction mode information may be information indicating the determined intra prediction mode, and the intra prediction type information may be information indicating the determined intra prediction type. That is, the encoding apparatus may generate intra prediction mode information based on the determined intra prediction mode. Alternatively, the encoding apparatus may generate intra prediction type information based on the determined intra prediction type.

The intra prediction type information may represent information on whether to apply a normal intra prediction type using a reference line adjacent to the current block, multi-reference line (MRL) using a reference line that is not adjacent to the current block, intra sub-partitions (ISP) performing sub-partitioning for the current block, or matrix based intra prediction (MIP) using a matrix.

For example, the intra prediction type information may include an MIP flag representing whether the MIP is applied to the current block. Further, for example, the intra prediction type information may include intra sub-partitions (ISP) related information on sub-partitioning of ISP for the current block. For example, the ISP related information may include an ISP flag representing whether the ISP is applied to the current block or an ISP partitioning flag representing a partitioning direction. Further, for example, the intra prediction type information may include the MIP flag and the ISP related information. For example, the MIP flag may represent an intra_mip_flag syntax element. Further, for example, the ISP flag may represent an intra_subpartitions_mode_flag syntax element, and the ISP partitioning flag may represent an intra_subpartitions_split_flag syntax element.

The intra prediction mode information may represent the intra prediction mode to be applied to the current block among the intra prediction modes. For example, the intra prediction modes may include No. 0 to No. 66 intra prediction modes. For example, No. 0 intra prediction mode may represent a planar mode, and No. 1 intra prediction mode may represent a DC mode. Further, No. 2 to No. 66 intra prediction modes may be represented as directional or angular intra prediction modes, and may represent directions to be referred to. Further, No. 0 and No. 1 intra prediction modes may be represented as non-directional or non-angular intra prediction modes. The detailed explanation thereof has been made with reference to FIG. 5.

For example, the encoding apparatus may generate prediction related information for the current block, and the prediction related information may include intra prediction mode information and/or intra prediction type information. For example, the encoding apparatus may generate the prediction samples based on the intra prediction mode and/or the intra prediction type. Alternatively, the encoding apparatus may generate the prediction samples based on the prediction related information.

The encoding apparatus may generate residual samples of the current block based on the prediction samples (S1320). For example, the encoding apparatus may generate the residual samples based on the original samples (e.g., input image signal) and the prediction samples. Further, for example, the encoding apparatus may generate the residual samples based on a difference between the original samples and the prediction samples.

The encoding apparatus may generate residual related information including information on transform coefficients for the current block based on the residual samples (S1330). For example, the encoding apparatus may derive the transform coefficients by performing primary transform based on the residual samples. Further, for example, the encoding apparatus may derive temporary transform coefficients by performing the primary transform based on the residual samples, and may derive the transform coefficients by applying the LFNST to the temporary transform coefficients. For example, in case that the LFNST is applied, the encoding apparatus may generate the LFNST index information. That is, the encoding apparatus may generate the LFNST index information based on the transform kernel used to generate the information one the transform coefficients.

For example, the encoding apparatus may derive quantized transform coefficients by performing quantization based on the transform coefficients. Further, the encoding apparatus may generate information on the quantized transform coefficients based on the quantized transform coefficients. Further, the residual information may include information on the quantized transform coefficients. The information one the quantized transform coefficients may be simply called information on the transform coefficients.

The encoding apparatus may encode image information including the intra prediction type information and the residual information (S1340). For example, the residual information may include the information on the (quantized) transform coefficients as described above. Further, for example, the image information may include the LFNST index information. Further, for example, the image information may not include the LFNST index information.

For example, the image information may include the LFNST index information representing information on a non-separable transform for low-frequency transform coefficients of the current block. Further, for example, the residual related information may include the LFNST index information based on the MIP flag or the size of the current block. Further, for example, the residual related information may include the LFNST index information based on the MIP flag or the information on the current block. Here, the information on the current block may include at least one of the size of the current block, tree structure information representing a single tree or a dual tree, an LFNST enabled flag or ISP related information. For example, the MIP flag may be one of a plurality of conditions for determining whether the residual related information includes the LFNST index information, and by other conditions, such as the size of the current block, in addition to the MIP flag, the residual related information may include the LFNST index information. However, hereinafter, explanation will be made around the MIP flag. Here, the LFNST index information may be represented as transform index information. Further, the LFNST index information may be represented as the st_idx syntax element or the lfnst_idx syntax element.

For example, the image information may include the LFNST index information based on the MIP flag representing that the MIP is not applied. Further, for example, the image information may not include the LFNST index information based on the MIP flag representing that the MIP is applied. That is, in case that the MIP flag represents that the MIP is applied to the current block (e.g., in case that the value of the intra_mip_flag syntax element is 1), the image information may not include the LFNST index information, and in case that the MIP flag represent that the MIP is not applied to the current block (e.g., in case that the value of the intra_mip_flag syntax element is 0), the image information may include the LFNST index information.

Further, for example, the image information may include the LFNST index information based on the MIP flag and the ISP related information. For example, in case that the MIP flag represents that the MIP is not applied to the current block (e.g., in case that the value of the intra_mip_flag syntax element is 0), the residual related information may include the LFNST index information with reference to the ISP related information (IntraSubPartitionsSplitType). Here, the IntraSubPartitionsSplitType may represent that the ISP is not applied (ISP_NO_SPLIT), the ISP is applied in a horizontal direction (ISP_HOR_SPLIT), or the ISP is applied in a vertical direction (ISP_VER_SPLIT), and this may be derived based on the ISP flag or the ISP partitioning flag.

For example, as the MIP flag represents that the MIP is applied to the current block, the LFNST index information may be induced or derived to be used, and in this case, the image information may not include the LFNST index information. That is, the encoding apparatus may not signal the LFNST index information. For example, the LFNST index information may be induced or derived to be used based on at least one of reference line index information for the current block, intra prediction mode information of the current block, size information of the current block, and the MIP flag.

Further, for example, the LFNST index information may include an LFNST flag representing whether non-separable transform for the low-frequency transform coefficients of the current block is applied and/or a transform kernel index flag representing the transform kernel applied to the current block among transform kernel candidates. That is, although the LFNST index information may represent the information on the non-separable transform for the low-frequency transform coefficients of the current block based on one syntax element or one piece of information, it may also represent the information based on two syntax elements or two pieces of information. For example, the LFNST flag may be represented as the st_flag syntax element or the lfnst_flag syntax element, and the transform kernel index flag may be represented as the st_idx_flag syntax element, the st_kernel_flag syntax element, the lfnst_idx_flag syntax element, or the lfnst_kernel_flag syntax element. Here, the transform kernel index flag may be included in the LFNST index information based on the LFNST flag representing that the non-separable transform is applied and the MIP flag representing that the MIP is not applied. That is, in case that the LFNST flag represents that the non-separable transform is applied and the MIP flag represents that the MIP is applied, the LFNST index information may include the transform kernel index flag.

For example, as the MIP flag represents that the MIP is applied to the current block, the LFNST flag and the transform kernel index flag may be induced or derived to be used, and in this case, the image information may not include the LFNST flag and the transform kernel index flag. That is, the encoding apparatus may not signal the LFNST flag and the transform kernel index flag. For example, the LFNST flag and the transform kernel index flag may be induced or derived to be used based on at least one of reference line index information for the current block, intra prediction mode information of the current block, size information of the current block, and the MIP flag.

For example, in case that the image information includes the LFNST index information, the LFNST index information may be represented through binarization. For example, the LFNST index information (e.g., st_idx syntax element or lfnst_idx syntax element) may be represented through truncated rice (TR) based binarization based on the MIP flag representing that the MIP is not applied, and the LFNST index information (e.g., st_idx syntax element or lfnst_idx syntax element) may be represented through fixed length (FL) based binarization based on the MIP flag representing that the MIP is applied. That is, in case that the MIP flag represents that the MIP is not applied to the current block (e.g., in case that the intra_mip_flag syntax element is 0 or false), the LFNST index information (e.g., st_idx syntax element or lfnst_idx syntax element) may be represented through the TR based binarization, and in case that the MIP flag represents that the MIP is applied to the current block (e.g., in case that the intra_mip_flag syntax element is 1 or true), the LFNST index information (e.g., st_idx syntax element or lfnst_idx syntax element) may be represented through the FL based binarization.

Further, for example, in case that the image information includes the LFNST index information, and the LFNST index information includes the LFNST flag and the transform kernel index flag, the LFNST flag and the transform kernel index flag may be represented through the fixed length (FL) based binarization.

For example, the LFNST index information may be represented as (a bin of) a bind string through the above-described binarization, and by coding this, a bit, a bit string, or a bitstream may be generated.

For example, (the first) bin of the bin string of the LFNST flag may be coded based on context coding, and the context coding may be performed based on the value of context index increment for the LFNST flag. Here, the context coding is a coding being performed based on a context model, and may be called a regular coding. Further, the context model may be represented by the context index ctsIdx, and the context index may be represented based on the context index increment ctxInc and context index offset ctxIdxOffset. For example, the value of the context index increment may be represented as one of candidates including 0 and 1. For example, the value of the context index increment may be determined based on the MTS index (e.g., mts_idx syntax element or tu_mts_idx syntax element) representing the transform kernel set to be used for the current block among the transform kernel sets and the tree type information representing the partitioning structure of the current block. Here, the tree type information may represent a single tree representing that partitioning structures of the luma component and the chroma component of the current block are equal to each other or a dual tree representing that the partitioning structures of the luma component and the chroma component of the current block are different from each other.

For example, (the first) bin of the bin string of the transform kernel index flag may be coded based on bypass coding. Here, the bypass coding may represent that the context coding is performed based on the regular probability distribution, and the coding efficiency can be enhanced through omission of the context coding update procedure.

Further, although not illustrated in FIG. 13, for example, the encoding apparatus may generate reconstructed samples based on the residual samples and the prediction samples. Further, a reconstructed block and a reconstructed picture may be derived based on the reconstructed samples.

For example, the encoding apparatus may generate the bitstream or encoded information by encoding image information including all or parts of the above-described pieces of information (or syntax elements). Further, the encoding apparatus may output the information in the form of a bitstream. Further, the bitstream or the encoded information may be transmitted to the decoding apparatus through a network or a storage medium. Further, the bitstream or the encoded information may be stored in a computer readable storage medium, and the bitstream or the encoded information may be generated by the above-described image encoding method.

Figure 15:
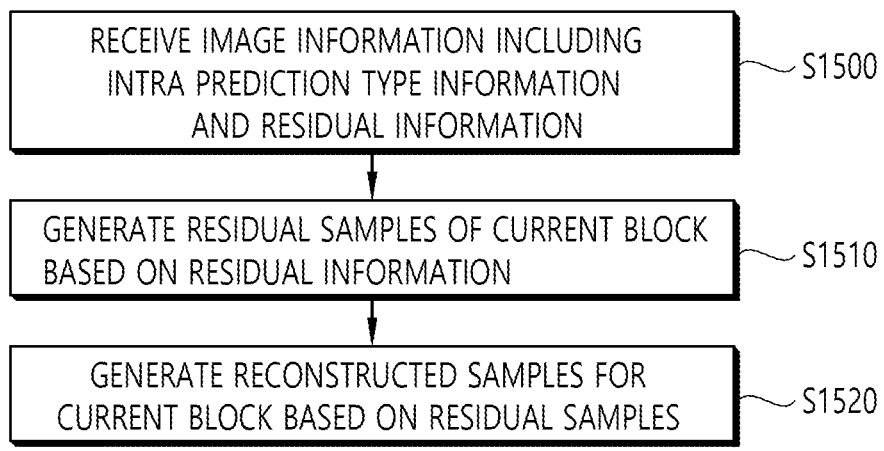
FIGS. 15 and 16 schematically illustrate a video/image decoding method and an example of related components according to embodiment(s) of the present document.
Figure 16:
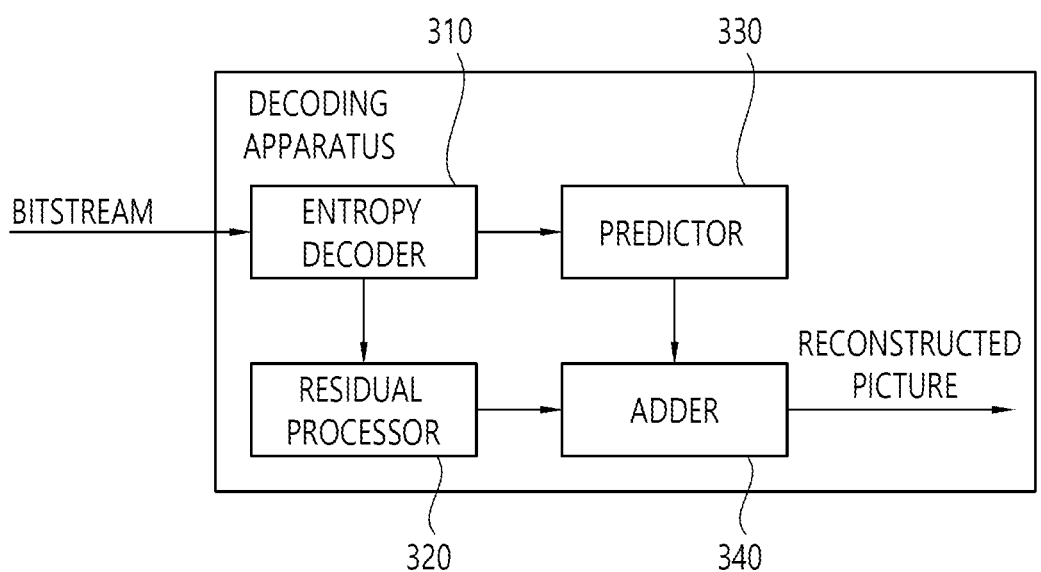

FIGS. 15 and 16 schematically illustrate a video/image decoding method and an example of related components according to embodiment(s) of the present document.

The method disclosed in FIG. 15 may be performed by a decoding apparatus disclosed in FIG. 3 or FIG. 16. Specifically, for example, S1500 of FIG. 15 may be performed by the entropy decoder 310 of the decoding apparatus of FIG. 16, and S1510 and S1520 of FIG. 15 may be performed by the residual processor 320 of the decoding apparatus of FIG. 16 and S1520 of FIG. 15 may be performed by the adder 240 of the decoding apparatus of FIG. 16. Further, although not illustrated in FIG. 15, the entropy decoder 310 of the decoding apparatus of FIG. 16 may derive prediction related information or residual information from the bitstream, the residual processor 320 of the decoding apparatus may derive residual samples from the residual information, the predictor 330 of the decoding apparatus may derive prediction samples from the prediction related information, and the adder 340 of the decoding apparatus may derive a reconstructed block or a reconstructed picture from the residual samples or the prediction samples. The method disclosed in FIG. 15 may include the above-described embodiments of the present document.

Referring to FIG. 15, the decoding apparatus may receive image information including residual information for the current block (S1500). For example, the image information may include intra prediction type information. For example, the decoding apparatus may obtain the intra prediction type information or the residual information by parsing or decoding the bitstream. Here, the bitstream may be called encoded (image) information.

For example, the decoding apparatus may obtain prediction related information from the bitstream, and the prediction related information may include intra prediction mode information and/or intra prediction type information. For example, the decoding apparatus may generate prediction samples for the current block.

The intra prediction mode information may represent the intra prediction mode to be applied to the current block among the intra prediction modes. For example, the intra prediction modes may include No. 0 to No. 66 intra prediction modes. For example, No. 0 intra prediction mode may represent a planar mode, and No. 1 intra prediction mode may represent a DC mode. Further, No. 2 to No. 66 intra prediction modes may be represented as directional or angular intra prediction modes, and may represent directions to be referred to. Further, No. 0 and No. 1 intra prediction modes may be represented as non-directional or non-angular intra prediction modes. The detailed explanation thereof has been made with reference to FIG. 5.

Further, the intra prediction type information may represent information on whether to apply a normal intra prediction type using a reference line adjacent to the current block, multi-reference line (MRL) using a reference line that is not adjacent to the current block, intra sub-partitions (ISP) performing sub-partitioning for the current block, or matrix based intra prediction (MIP) using a matrix.

For example, the decoding apparatus may obtain residual information from the bitstream. Here, the residual information may represent information being used to derive residual samples, and may include information on the residual samples, (inverse) transform related information, and/or (inverse) quantization related information. For example, the residual information may include information on quantized transform coefficients.

For example, the intra prediction type information may include an MIP flag representing whether the MIP is applied to the current block. Further, for example, the intra prediction type information may include intra sub-partitions (ISP) related information on sub-partitioning of ISP for the current block. For example, the ISP related information may include an ISP flag representing whether the ISP is applied to the current block or an ISP partitioning flag representing a partitioning direction. Further, for example, the intra prediction type information may include the MIP flag and the ISP related information. For example, the MIP flag may represent an intra_mip_flag syntax element. Further, for example, the ISP flag may represent an intra_subpartitions_mode_flag syntax element, and the ISP partitioning flag may represent an intra_subpartitions_split_flag syntax element.

For example, the image information may include the low-frequency non-separable transform (LFNST) index information representing information on a non-separable transform for low-frequency transform coefficients of the current block. Further, for example, the residual related information may include the LFNST index information based on the MIP flag or the size of the current block. Further, for example, the residual related information may include the LFNST index information based on the MIP flag or the information on the current block. Here, the information on the current block may include at least one of the size of the current block, tree structure information representing a single tree or a dual tree, an LFNST enabled flag or ISP related information. For example, the MIP flag may be one of a plurality of conditions for determining whether the residual related information includes the LFNST index information, and by other conditions, such as the size of the current block, in addition to the MIP flag, the residual related information may include the LFNST index information. However, hereinafter, explanation will be made around the MIP flag. Here, the LFNST index information may be represented as transform index information. Further, the LFNST index information may be represented as the st_idx syntax element or the lfnst_idx syntax element.

For example, the image information may include the LFNST index information based on the MIP flag representing that the MIP is not applied. Further, for example, the image information may not include the LFNST index information based on the MIP flag representing that the MIP is applied. That is, in case that the MIP flag represents that the MIP is applied to the current block (e.g., in case that the value of the intra_mip_flag syntax element is 1), the image information may not include the LFNST index information, and in case that the MIP flag represent that the MIP is not applied to the current block (e.g., in case that the value of the intra_mip_flag syntax element is 0), the image information may include the LFNST index information.

Further, for example, the image information may include the LFNST index information based on the MIP flag and the ISP related information. For example, in case that the MIP flag represents that the MIP is not applied to the current block (e.g., in case that the value of the intra_mip_flag syntax element is 0), the image information may include the LFNST index information with reference to the ISP related information (IntraSubPartitionsSplitType). Here, the IntraSubPartitionsSplitType may represent that the ISP is not applied (ISP_NO_SPLIT), the ISP is applied in a horizontal direction (ISP_HOR_SPLIT), or the ISP is applied in a vertical direction (ISP_VER_SPLIT), and this may be derived based on the ISP flag or the ISP partitioning flag.

For example, as the MIP flag represents that the MIP is applied to the current block, the LFNST index information may be induced or derived to be used in case that the image information does not include the LFNST index information, that is, in case that the LFNST index information is not signaled. For example, the LFNST index information may be derived based on at least one of reference line index information for the current block, intra prediction mode information of the current block, size information of the current block, and the MIP flag.

Further, for example, the LFNST index information may include an LFNST flag representing whether non-separable transform for the low-frequency transform coefficients of the current block is applied and/or a transform kernel index flag representing the transform kernel applied to the current block among transform kernel candidates. That is, although the LFNST index information may represent the information on the non-separable transform for the low-frequency transform coefficients of the current block based on one syntax element or one piece of information, it may also represent the information based on two syntax elements or two pieces of information. For example, the LFNST flag may be represented as the st_flag syntax element or the lfnst_flag syntax element, and the transform kernel index flag may be represented as the st_idx_flag syntax element, the st_kernel_flag syntax element, the lfnst_idx_flag syntax element, or the lfnst_kernel_flag syntax element. Here, the transform kernel index flag may be included in the LFNST index information based on the LFNST flag representing that the non-separable transform is applied and the MIP flag representing that the MIP is not applied. That is, in case that the LFNST flag represents that the non-separable transform is applied and the MIP flag represents that the MIP is applied, the LFNST index information may include the transform kernel index flag.

For example, as the MIP flag represents that the MIP is applied to the current block, the LFNST flag and the transform kernel index flag may be induced or derived in case that the image information does not include the LFNST flag and the transform kernel index flag, that is, the LFNST flag and the transform kernel index flag are not signaled. For example, the LFNST flag and the transform kernel index flag may be derived based on at least one of reference line index information for the current block, intra prediction mode information of the current block, size information of the current block, and the MIP flag.

For example, in case that the image information includes the LFNST index information, the LFNST index information may be represented through binarization. For example, the LFNST index information (e.g., st_idx syntax element or lfnst_idx syntax element) may be derived through truncated rice (TR) based binarization based on the MIP flag representing that the MIP is not applied, and the LFNST index information (e.g., st_idx syntax element or lfnst_idx syntax element) may be derived through fixed length (FL) based binarization based on the MIP flag representing that the MIP is applied. That is, in case that the MIP flag represents that the MIP is not applied to the current block (e.g., in case that the intra_mip_flag syntax element is 0 or false), the LFNST index information (e.g., st_idx syntax element or lfnst_idx syntax element) may be derived through the TR based binarization, and in case that the MIP flag represents that the MIP is applied to the current block (e.g., in case that the intra_mip_flag syntax element is 1 or true), the LFNST index information (e.g., st_idx syntax element or lfnst_idx syntax element) may be derived through the FL based binarization.

Further, for example, in case that the image information includes the LFNST index information, and the LFNST index information includes the LFNST flag and the transform kernel index flag, the LFNST flag and the transform kernel index flag may be derived through the fixed length (FL) based binarization.

For example, the LFNST index information may derive candidates through the above-described binarization, may compare bins represented by parsing or decoding the bitstream with the candidates, and through this, the LFNST index information may be obtained.

For example, (the first) bin of the bin string of the LFNST flag may be derived based on context coding, and the context coding may be performed based on the value of context index increment for the LFNST flag. Here, the context coding is a coding being performed based on the context model, and may be called a regular coding. Further, the context model may be represented by the context index ctsIdx, and the context index may be derived based on the context index increment ctxInc and context index offset ctxIdxOffset. For example, the value of the context index increment may be derived as one of candidates including 0 and 1. For example, the value of the context index increment may be derived based on the MTS index (e.g., mts_idx syntax element or tu_mts_idx syntax element) representing the transform kernel set to be used for the current block among the transform kernel sets and the tree type information representing the partitioning structure of the current block. Here, the tree type information may represent a single tree representing that partitioning structures of the luma component and the chroma component of the current block are equal to each other or a dual tree representing that the partitioning structures of the luma component and the chroma component of the current block are different from each other.

For example, (the first) bin of the bin string of the transform kernel index flag may be derived based on bypass coding. Here, the bypass coding may represent that the context coding is performed based on the regular probability distribution, and the coding efficiency can be enhanced through omission of the context coding update procedure.

For example, the decoding apparatus may generate the residual samples from the information on the quantized transform coefficients based on the LFNST index information. For example, the residual information may include information on the quantized transform coefficients of the current block. Or, for example, residual related information may include information on quantized transform coefficients, and the decoding apparatus may derive the quantized transform coefficients for the current block based on the information on the quantized transform coefficients. For example, the decoding apparatus may derive the transform coefficients for the current block by performing dequantization on the quantized transform coefficients. Or, for example, the decoding apparatus may generate residual samples from the derived transform coefficients by using the LFNST index information.

For example, in case that the LFNST index information is included in the image information or the LFNST index information is induced or derived, the LFNST may be performed with respect to the transform coefficients in accordance with the LFNST index information, and modified transform coefficients may be derived. Thereafter, the decoding apparatus may generate the residual samples based on the modified transform coefficients. Further, for example, in case that the LFNST index information is not included in the image information or it is represented that the LFNST is not performed, the decoding apparatus may not perform the LFNST with respect to the transform coefficients, but may generate the residual samples based on the transform coefficients.

The decoding apparatus may generate reconstructed samples for the current block based on the residual samples (S1520). For example, the decoding apparatus may generate the reconstructed samples based on the prediction samples and the residual samples. Further, for example, the reconstructed block and the reconstructed picture may be derived based on the reconstructed samples.

For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 17:
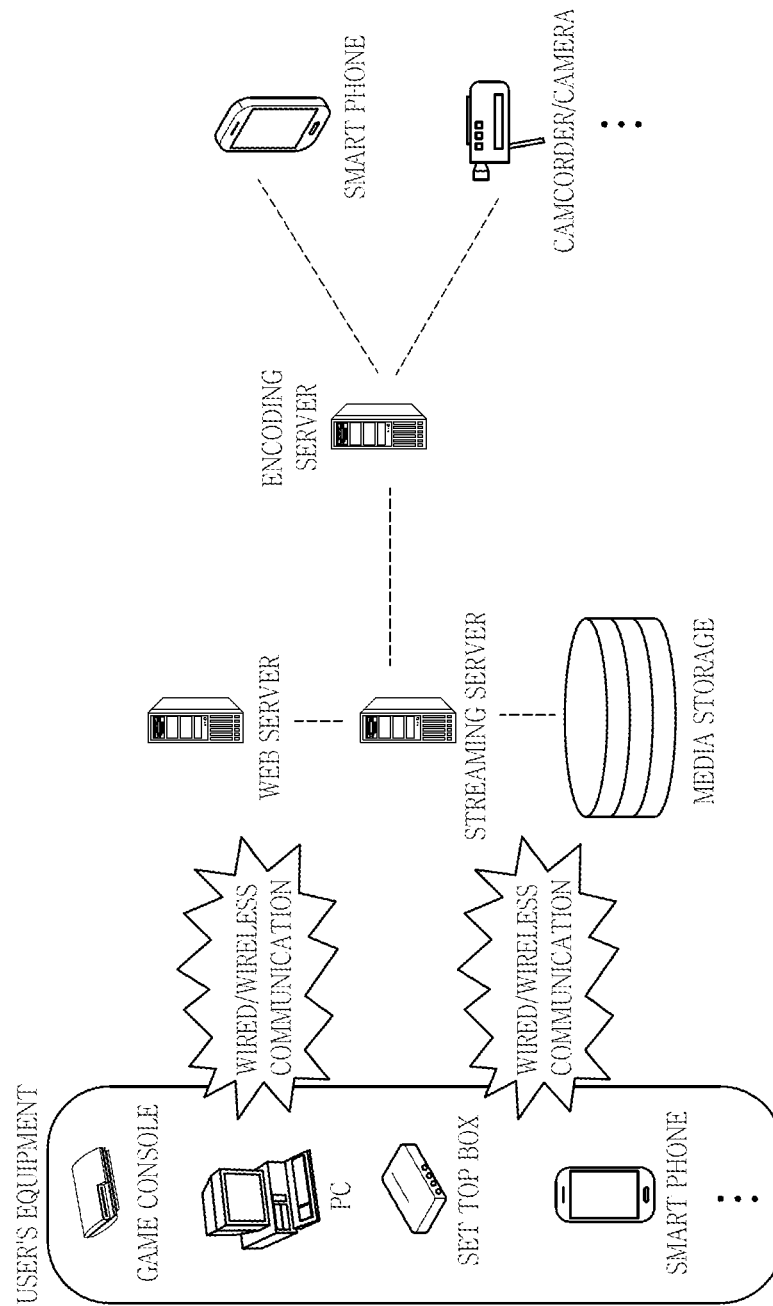
FIG. 17 illustrates an example of a content streaming system to which embodiments disclosed in the present document are applicable.

FIG. 17 represents an example of a contents streaming system to which the embodiment of the present document may be applied.

Referring to FIG. 17, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the method comprising:
    receiving image information including residual information for a current block;
    deriving prediction samples of the current block based on intra prediction;
    generating residual samples of the current block based on the residual information; and
    generating reconstructed samples for the current block based on the prediction samples and the residual samples,
    wherein the image information includes intra prediction type information for the current block,
    wherein based on a tree type of the current block being single tree or dual tree luma, the intra prediction type information includes a matrix based intra prediction (MIP) flag representing whether MIP is applied to the current block,
    wherein in response to the MIP being applied to the current block as the value of the MIP flag is equal to 1, the prediction samples of the current block are derived by reducing neighboring reference samples of the current block, performing a matrix-multiplication on the reduced neighboring reference samples, and adding an offset to values on which the matrix-multiplication is performed,
    wherein a size of the matrix used for the matrix-multiplication is determined in response to a size of the current block,
    wherein the size of the matrix is 16×8 in response to the size of the current block being 8×8,
    wherein based on an intra sub-partitions (ISP) being not applied to the current block, a width and height of the current block being more than 4, an intra mode being applied to the current block, and the MIP flag representing that the MIP is not applied, the image information includes low frequency non-separable transform (LFNST) index information related to one of transform kernels in an LFNST transform set for the current block,
    wherein a parsing order of the MIP flag always precedes a parsing order of the LFNST index information, wherein based on the MIP flag representing that the MIP is applied, the image information does not include the LFNST index information, wherein based on the LFNST index information being not present as the image information does not include the LFNST index information, a value of the LFNST index information is derived as 0, wherein the residual information includes information on quantized transform coefficients of the current block, and wherein the residual samples are generated based on the information on the quantized transform coefficients by using the LFNST index information.

2. An image encoding method performed by an encoding apparatus, the method comprising:

generating prediction samples of a current block by performing intra prediction on the current block;

generating intra prediction type information for the current block based on the performed intra prediction;

generating residual samples of the current block based on the prediction samples;

generating residual information including information on quantized transform coefficients for the current block based on the residual samples; and encoding image information including the intra prediction type information and the residual information, wherein based on a tree type of the current block being single tree or dual tree luma, the intra prediction type information includes a matrix based intra prediction (MIP) flag representing whether MIP is applied to the current block, wherein in response to the value of the MIP flag equal to 1 as the MIP is applied to the current block, prediction samples of the current block are derived by reducing neighboring reference samples of the current block, performing a matrix-multiplication on the reduced neighboring reference samples, and adding an offset to values on which the matrix-multiplication is performed, wherein a size of the matrix used for the matrix-multiplication is determined in response to a size of the current block, wherein the size of the matrix is 16×8 in response to the size of the current block being 8×8, wherein based on an intra sub-partitions (ISP) being not applied to the current block, a width and height of the current block being more than 4, an intra mode being applied to the current block, and the MIP flag representing that the MIP is not applied the image information includes low frequency non-separable transform (LFNST) index information related to one of transform kernels in an LFNST transform set for the current block, wherein a signaling order of the MIP flag always precedes a signaling order of the LFNST index information, wherein based on the MIP flag representing that the MIP is applied, the image information does not include the LFNST index information, and wherein based on the LFNST index information being not present as the image information does not include the LFNST index information, a value of the LFNST index information is equal to 0.

3. A non-transitory computer-readable storage medium storing a bitstream generated by an encoding method, the method comprising:

generating prediction samples of a current block by performing intra prediction on the current block;

generating intra prediction type information for the current block based on the performed intra prediction;

generating residual samples of the current block based on the prediction samples;

generating residual information including information on quantized transform coefficients for the current block based on the residual samples; and encoding image information including the intra prediction type information and the residual information, wherein based on a tree type of the current block being single tree or dual tree luma, the intra prediction type information includes a matrix based intra prediction (MIP) flag representing whether MIP is applied to the current block, wherein in response to the value of the MIP flag equal to 1 as the MIP is applied to the current block, prediction samples of the current block are derived by reducing neighboring reference samples of the current block, performing a matrix-multiplication on the reduced neighboring reference samples, and adding an offset to values on which the matrix-multiplication is performed, wherein a size of the matrix used for the matrix-multiplication is determined in response to a size of the current block, wherein the size of the matrix is 16×8 in response to the size of the current block being 8×8, wherein based on an intra sub-partitions (ISP) being not applied to the current block, a width and height of the current block being more than 4, an intra mode being applied to the current block, and the MIP flag representing that the MIP is not applied the image information includes low frequency non-separable transform (LFNST) index information related to one of transform kernels in an LFNST transform set for the current block, wherein a signaling order of the MIP flag always precedes a signaling order of the LFNST index information, wherein based on the MIP flag representing that the MIP is applied, the image information does not include the LFNST index information, and wherein based on the LFNST index information being not present as the image information does not include the LFNST index information, a value of the LFNST index information is equal to 0.

4. A transmission method of data for an image, the method comprising:

obtaining a bitstream for the image, the bitstream is generated by performing determining an intra prediction type for a current block, generating prediction samples of a current block by performing intra prediction on the current block, generating intra prediction type information for the current block based on the performed intra prediction, generating residual samples of the current block based on the prediction samples, generating residual information including information on quantized transform coefficients for the current block based on the residual samples, and encoding image information including the intra prediction type information and the residual information to generate the bitstream; and transmitting the data comprising the bitstream, wherein based on a tree type of the current block being single tree or dual tree luma, the intra prediction type information includes a matrix based intra prediction (MIP) flag representing whether MIP is applied to the current block, wherein in response to the value of the MIP flag equal to 1 as the MIP is applied to the current block, prediction samples of the current block are derived by reducing neighboring reference samples of the current block, performing a matrix-multiplication on the reduced neighboring reference samples, and adding an offset to values on which the matrix-multiplication is performed, wherein a size of the matrix used for the matrix-multiplication is determined in response to a size of the current block, wherein the size of the matrix is 16×8 in response to the size of the current block being 8×8, wherein based on an intra sub-partitions (ISP) being not applied to the current block, a width and height of the current block being more than 4, an intra mode being applied to the current block and the MIP flag representing that the MIP is not applied the image information includes low frequency non-separable transform (LFNST) index information related to one of transform kernels in an LFNST transform set for the current block, wherein a signaling order of the MIP flag always precedes a signaling order of the LFNST index information, wherein based on the MIP flag representing that the MIP is applied, the image information does not include the LFNST index information, and wherein based on the LFNST index information being not present as the image information does not include the LFNST index information, a value of the LFNST index information is equal to 0.

* * * * *